United States Patent
Tanaka et al.

(10) Patent No.: US 10,221,799 B2
(45) Date of Patent: Mar. 5, 2019

(54) CONTROL DEVICE FOR INTERNAL COMBUSTION ENGINE

(71) Applicant: TOYOTA JIDOSHA KABUSHIKI KAISHA, Aichi (JP)

(72) Inventors: Satoru Tanaka, Odawara (JP); Satoshi Yoshizaki, Gotenba (JP); Yusuke Saito, Susono (JP); Ryutaro Moriguchi, Susono (JP); Noriyasu Adachi, Namazu (JP); Yosuke Matsumoto, Susono (JP); Naoya Takagi, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 394 days.

(21) Appl. No.: 14/892,696

(22) PCT Filed: May 24, 2013

(86) PCT No.: PCT/JP2013/064514
§ 371 (c)(1),
(2) Date: Nov. 20, 2015

(87) PCT Pub. No.: WO2014/188595
PCT Pub. Date: Nov. 27, 2014

(65) Prior Publication Data
US 2016/0090935 A1 Mar. 31, 2016

(51) Int. Cl.
*F02D 41/26* (2006.01)
*F02P 5/15* (2006.01)
(Continued)

(52) U.S. Cl.
CPC ............. *F02D 41/26* (2013.01); *F02D 37/02* (2013.01); *F02D 41/0002* (2013.01);
(Continued)

(58) Field of Classification Search
CPC ........ F02D 41/26; F02D 41/307; F02D 41/34; F02D 41/0002; F02D 37/02;
(Continued)

(56) References Cited

U.S. PATENT DOCUMENTS 4,763,264 A * 8/1988 Okuno .................. F02D 11/105
123/361
5,272,871 A * 12/1993 Oshima ................. B01F 5/0451
60/274
(Continued)

FOREIGN PATENT DOCUMENTS

DE 102004033073 A1 1/2006
JP H07-119512 A 5/1995
(Continued)

*Primary Examiner* — Hung Q Nguyen
*Assistant Examiner* — Brian P Monahon
(74) *Attorney, Agent, or Firm* — Hauptman Ham, LLP

(57) ABSTRACT

A target air amount for achieving a requested torque is back-calculated from the requested torque using a virtual air-fuel ratio. The virtual air-fuel ratio is changed from a first air-fuel ratio to a second air-fuel ratio in response to a condition for switching an operation mode from operation in the first air-fuel ratio to operation in the second air-fuel ratio being satisfied. After the virtual air-fuel ratio is changed from the first air-fuel ratio to the second air-fuel ratio, an interval of time passes and the target air-fuel ratio is then switched from the first air-fuel ratio to a third air-fuel ratio that is an intermediate air-fuel ratio between the first air-fuel ratio and the second air-fuel ratio. The target air-fuel ratio is temporarily held at the third air-fuel ratio, and is thereafter switched from the third air-fuel ratio to the second air-fuel ratio.

13 Claims, 8 Drawing Sheets

(51) Int. Cl.
  *F02D 37/02* (2006.01)
  *F02D 41/00* (2006.01)
  *F02D 41/34* (2006.01)
  F02D 23/00 (2006.01)
  F02D 41/30 (2006.01)
  F02D 13/02 (2006.01)
  F02D 11/10 (2006.01)

(52) U.S. Cl.
  CPC ......... *F02D 41/307* (2013.01); *F02D 41/34* (2013.01); *F02P 5/1504* (2013.01); F02D 11/105 (2013.01); F02D 13/0234 (2013.01); F02D 23/00 (2013.01); F02D 41/0007 (2013.01); F02D 41/3029 (2013.01); F02D 2041/001 (2013.01); F02D 2250/21 (2013.01); Y02T 10/42 (2013.01); Y02T 10/46 (2013.01)

(58) Field of Classification Search
  CPC ............. F02D 11/105; F02D 13/0234; F02D 2041/001; F02D 41/0007; F02D 2250/21; F02D 41/3029; F02D 23/00; F02P 5/1504; Y02T 10/42; Y02T 10/46
  See application file for complete search history.

(56) References Cited

U.S. PATENT DOCUMENTS

| | | | | |
|---|---|---|---|---|
| 5,533,329 A * | 7/1996 | Ohyama | .................... | F23R 3/26 60/39.27 |
| 5,850,815 A * | 12/1998 | Yano | .................... | F02D 13/0207 123/406.47 |
| 5,857,445 A | 1/1999 | Shimada et al. | | |
| 5,875,756 A | 3/1999 | Kamura et al. | | |
| 5,947,077 A * | 9/1999 | Yonezawa | ............... | F02D 37/02 123/295 |
| 6,026,779 A * | 2/2000 | Obata | .................... | F02D 37/02 123/295 |
| 6,089,206 A | 7/2000 | Suzuki et al. | | |
| 6,470,252 B2 * | 10/2002 | Tashiro | ................. | B60W 10/04 477/107 |
| 6,497,212 B2 * | 12/2002 | Matsumoto | ............. | F02D 37/02 123/295 |
| 6,604,504 B2 * | 8/2003 | Surnilla | ................ | F01N 3/0842 123/295 |
| 6,647,959 B2 * | 11/2003 | Noguchi | ............... | F02D 11/105 123/396 |
| 6,739,320 B2 * | 5/2004 | Ito | .......................... | F02D 41/00 123/520 |
| 6,754,578 B1 * | 6/2004 | Bidner | ................... | F02D 17/02 701/108 |
| 7,059,120 B2 * | 6/2006 | Nakagawa | ............. | F01N 3/101 60/276 |
| 8,473,183 B2 * | 6/2013 | Takahashi | ............... | F02D 37/02 123/406.23 |
| 8,594,905 B2 * | 11/2013 | Shiomi | ................... | F02D 17/02 123/198 F |
| 2002/0060495 A1 * | 5/2002 | Mizutani | ............... | B60T 8/4809 303/114.3 |
| 2005/0109318 A1 * | 5/2005 | Ichihara | ................ | F02D 11/105 123/406.45 |
| 2010/0269785 A1 * | 10/2010 | Tanaka | ................... | F02D 37/02 123/348 |
| 2011/0106410 A1 * | 5/2011 | Yoshino | .............. | F02D 13/0226 701/103 |
| 2012/0035834 A1 | 2/2012 | Takahashi | | |
| 2012/0085318 A1 * | 4/2012 | Okazaki | ................. | F02D 11/105 123/350 |
| 2012/0166064 A1 * | 6/2012 | Yamamoto | ............. | F02D 9/105 701/103 |
| 2013/0275028 A1 * | 10/2013 | Okazaki | ................. | F02D 37/02 701/104 |

FOREIGN PATENT DOCUMENTS

| | | |
|---|---|---|
| JP | H09-60543 A | 3/1997 |
| JP | H10-68375 A | 3/1998 |
| JP | H11-22609 A | 1/1999 |
| JP | 2007-126989 A | 5/2007 |

* cited by examiner

CONTROL DEVICE FOR INTERNAL COMBUSTION ENGINE

CROSS-REFERENCE TO RELATED APPLICATION

This is a national phase application based on the PCT International Patent Application No. PCT/JP2013/064514 filed May 24, 2013, the entire contents of which are incorporated herein by reference.

TECHNICAL FIELD

The present invention relates to a control device that performs integrated control of an air amount, a fuel supply amount and an ignition timing of an internal combustion engine that is configured to be capable of switching an air-fuel ratio that is used for operation between at least two air-fuel ratios.

BACKGROUND ART

In Japanese Patent Laid-Open No. 11-22609, technology (hereunder, referred to as "prior art") is disclosed that relates to control for switching a combustion system in an internal combustion engine in which the combustion system of the internal combustion engine can be switched from stratified combustion to homogeneous combustion, or from homogeneous combustion to stratified combustion. Since an air-fuel ratio during stratified combustion is leaner than an air-fuel ratio during homogeneous combustion, switching of the air-fuel ratio accompanies switching of the combustion system. Known methods for switching an air-fuel ratio include a method that gradually changes the air-fuel ratio so that a torque level difference does not arise. However, according to the aforementioned known method, although a torque level difference is lessened, there is the problem that the desired torque cannot be obtained, and because an air-fuel ratio that is not originally intended is used, there is a deterioration in the emissions. The aforementioned prior art has been proposed as a solution to these problems.

According to the aforementioned prior art, at a time of switching from homogeneous combustion to stratified combustion, only the target air amount is switched in a step manner before switching the target equivalence ratio in a step manner. More specifically, only the target air amount is increased in a step manner to increase the air amount in advance, and a target equivalence ratio is decreased in a step manner at a timing at which the actual air amount reaches the target air amount. That is, during a period in which the air amount is increasing with a delay relative to the target air amount, the target equivalence ratio is maintained at the ratio that is used prior to switching of the combustion system. However, when the fuel amount is decided based on the target equivalence ratio from prior to switching of the combustion system, the fuel amount is in excess of an amount necessary to maintain the torque at a constant amount. Therefore, in the aforementioned prior art, an increase in the torque prior to switching of the combustion system is avoided by correcting the excessive portion of the fuel amount by retarding the ignition timing.

However, retardation of the ignition timing is accompanied by the possibility of misfiring. Misfiring leads to a deterioration in the drivability and a deterioration in exhaust performance. Although misfiring can be prevented by setting restrictions for retardation of the ignition timing, an increase in torque that is caused by an excessive fuel amount cannot be avoided.

CITATION LIST

Patent Literature

Patent Literature 1: Japanese Patent Laid-Open No. 11-22609

SUMMARY OF INVENTION

The present invention has been made in view of the above described problem, and an object of the present invention is, in an internal combustion engine that is configured to be capable of switching an air-fuel ratio that is used for operation between at least two air-fuel ratios, to switch the air-fuel ratio without producing fluctuations in the torque.

The present invention can be applied to the configuration of a control device for an internal combustion engine. Hereunder, an overview of a control device for an internal combustion engine according to the present invention will be described. However, as will be apparent from the contents of the present invention described below, the present invention can be applied to procedures of a method for controlling an internal combustion engine, and also to an algorithm of a program that is executed by a control device.

A control device according to the present invention has three kinds of actuators. A control object of the control device is an internal combustion engine that is configured to be capable of selecting between operation in a first air-fuel ratio and operation in a second air-fuel ratio that is leaner than the first air-fuel ratio. The three kinds of actuators a first actuator that changes an air amount, a second actuator that supplies fuel into a cylinder, and a third actuator that ignites an air-fuel mixture in a cylinder. The first actuator may include, for example, a throttle and a variable valve timing mechanism that varies a valve timing of an intake valve, and if the internal combustion engine is a supercharged engine, the first actuator also may be a supercharging characteristic varying actuator that varies a supercharging characteristic of a supercharger, specifically, a variable nozzle or a waste gate valve or the like. The second actuator is, specifically, an injector that injects fuel. For example, the second actuator may be a port injector that injects fuel into an intake port, and an in-cylinder injector that directly injects fuel into a cylinder. The third actuator is, specifically, an ignition device. The control device according to the present invention performs integrated control of an air amount, a fuel supply amount and an ignition timing of an internal combustion engine by means of coordinated operations of these three kinds of actuators.

The control device according to the present invention can be embodied by a computer. More specifically, the control device according to the present invention can be constituted by a computer that is equipped with a memory in which a program that describes processing for realizing various functions is stored, and a processor that reads the program from the memory and executes the program. Functions that the control device according to the present invention is equipped with include, as functions for determining a target air amount and a target air-fuel ratio to be used in coordinated operations of the three kinds of actuators described above, a requested torque reception function, a target air-fuel ratio switching function, a target air amount calculation function, and a virtual air-fuel ratio changing function.

According to the requested torque reception function, a requested torque with respect to the internal combustion engine is received. The requested torque is calculated based on a signal that is responsive to the degree of opening of an accelerator pedal that is operated by the driver. In a case where the driver issues a deceleration request with respect to the internal combustion engine, a requested torque is obtained that decreases in accordance with the speed at which the driver releases the accelerator pedal. In a case where the driver issues an acceleration request with respect to the internal combustion engine, a requested torque is obtained that increases in accordance with the speed at which the driver depresses the accelerator pedal.

According to the target air amount calculation function, a target air amount for achieving the requested torque is back-calculated from the requested torque. A parameter that provides a conversion efficiency of the air amount to torque is used for calculating the target air amount. The leaner that the air-fuel ratio becomes relative to the theoretical air-fuel ratio, the greater the decrease will be in the amount of torque that is generated with the same air amount. Therefore a parameter corresponding to the air-fuel ratio corresponds to a parameter that provides a conversion efficiency of the air amount to torque. A virtual air-fuel ratio is a parameter that corresponds to the air-fuel ratio, and is one parameter that can be used to calculate the target air amount. A value of the virtual air-fuel ratio is variable, and is changed by the virtual air-fuel ratio changing function. According to the virtual air-fuel ratio changing function, in response to a condition for switching the operation mode from operation according to the first air-fuel ratio to operation according to the second air-fuel ratio being satisfied, the virtual air-fuel ratio is changed from the first air-fuel ratio to the second air-fuel ratio. If the value of the requested torque is the same, the richer that the virtual air-fuel ratio is, the smaller that the target air amount becomes, while the leaner that the virtual air-fuel ratio is, the larger that the target air amount becomes.

According to the target air-fuel ratio switching function, after the virtual air-fuel ratio is changed from the first air-fuel ratio to the second air-fuel ratio, the target air-fuel ratio is switched from the first air-fuel ratio to a third air-fuel ratio that is an intermediate air-fuel ratio between the first air-fuel ratio and the second air-fuel ratio, and immediately thereafter is switched from the third air-fuel ratio to the second air-fuel ratio. That is, the target air-fuel ratio is not directly switched from the first air-fuel ratio to the second air-fuel ratio, but rather is temporarily switched to an intermediate third air-fuel ratio and is thereafter switched from the third air-fuel ratio to the second air-fuel ratio. Note that, the term "intermediate air-fuel ratio" used herein refers to an air-fuel ratio that is leaner than the first air-fuel ratio and is richer than the second air-fuel ratio, and is not limited to a median value between the first air-fuel ratio and the second air-fuel ratio.

Preferably, a specific timing for switching the target air-fuel ratio from the first air-fuel ratio to the third air-fuel ratio is a time point at which an air amount that is estimated based on the operation amount of the first actuator reaches an air amount with which the requested torque can be achieved under the third air-fuel ratio. However, in a case where an air amount with which the requested torque can be achieved under the third air-fuel ratio is less than a minimum air amount that does not cause the occurrence of misfiring, more preferably the target air-fuel ratio is switched from the first air-fuel ratio to the third air-fuel ratio after the air amount that is estimated based on the operation amount of the first actuator exceeds the minimum air amount. Further, in a case where the ignition timing is retarded as far as a retardation limit before the air amount that is estimated based on the operation amount of the first actuator reaches an air amount with which the requested torque can be achieved under the third air-fuel ratio, the target air-fuel ratio may be switched from the first air-fuel ratio to the third air-fuel ratio at that time point. However, preferably a condition for switching is that a shortfall in a torque that can be achieved under the third air-fuel ratio relative to the requested torque is less than an excess in a torque that can be achieved under the first air-fuel ratio relative to the requested torque.

Preferably, a specific timing for switching the target air-fuel ratio from the third air-fuel ratio to the second air-fuel ratio is a time point at which a difference between the target air amount and an estimated air amount becomes equal to or less than a threshold value. Further, the target air-fuel ratio may be switched from the third air-fuel ratio to the second air-fuel ratio at a time point at which a fixed time period elapses after the target air-fuel ratio is switched from the first air-fuel ratio to the third air-fuel ratio. In addition, the target air-fuel ratio may be switched from the third air-fuel ratio to the second air-fuel ratio at a time point at which a fixed time period elapses after the virtual air-fuel ratio is changed from the first air-fuel ratio to the second air-fuel ratio.

The control device according to the present invention subjects the three kinds of actuators to coordinated operations based on the target air amount and target air-fuel ratio determined by the above described processing. Functions that the control device of the present invention is equipped with include a first actuator control function, a second actuator control function and a third actuator control function as functions for performing coordinated operations based on the target air amount and target air-fuel ratio.

According to the first actuator control function, operation amount of the first actuator are determined based on the target air amount. Operation of the first actuator is then performed in accordance with the operation amounts that are determined. The actual air amount changes so as to track the target air amount according to the operation of the first actuator.

According to the second actuator control function, a fuel supply amount is determined based on the target air-fuel ratio. Operation of the second actuator is then performed in accordance with the fuel supply amount that is determined.

According to the third actuator control function, an ignition timing for achieving the requested torque is determined based on a torque that is estimated based on the operation amount of the first actuator and the target air-fuel ratio, and the requested torque. Operation of the third actuator is then performed in accordance with the determined ignition timing. The actual air amount can be estimated based on the operation amount of the first actuator, and the torque can be estimated based on the estimated air amount and the target air-fuel ratio. Operation of the third actuator is performed so as to correct an excessive amount of the estimated torque with respect to the requested torque by means of the ignition timing.

According to the control device of the present invention, by having the above described functions, the control device can switch an operation mode of an internal combustion engine from operation according to a first air-fuel ratio to operation according to a second air-fuel ratio that is leaner than the first air-fuel ratio without generating fluctuations in the torque.

DESCRIPTION OF EMBODIMENTS

Embodiment 1

Hereunder, Embodiment 1 of the present invention is described with reference to the drawings.

An internal combustion engine (hereinafter, referred to as "engine") which is a control object in the present embodiment is a spark-ignition type, four-cycle reciprocating engine. Further, the engine is a so-called "lean-burn engine" that is constructed so as to be capable of selecting between a stoichiometric mode (first operation mode) that performs operation according to a theoretical air-fuel ratio and a lean mode (second operation mode) that performs operation according to an air-fuel ratio that is leaner than the theoretical air-fuel ratio as the operation mode of the engine.

An ECU (electrical control unit) mounted in the vehicle controls operations of the engine by actuating various kinds of actuators that are provided in the engine. The actuators actuated by the ECU include a throttle and a variable valve timing mechanism (hereunder, referred to as "VVT") as first actuators that change an air amount, an injector as a second actuator that supplies fuel into a cylinder, and an ignition device as a third actuator that ignites an air-fuel mixture in a cylinder. The VVT is provided with respect to an intake valve. The injector is provided in an intake port. The ECU actuates these actuators to control operation of the engine. Control of the engine by the ECU includes switching of the operation mode from the stoichiometric mode to the lean mode, or from the lean mode to the stoichiometric mode.

Figure 1:
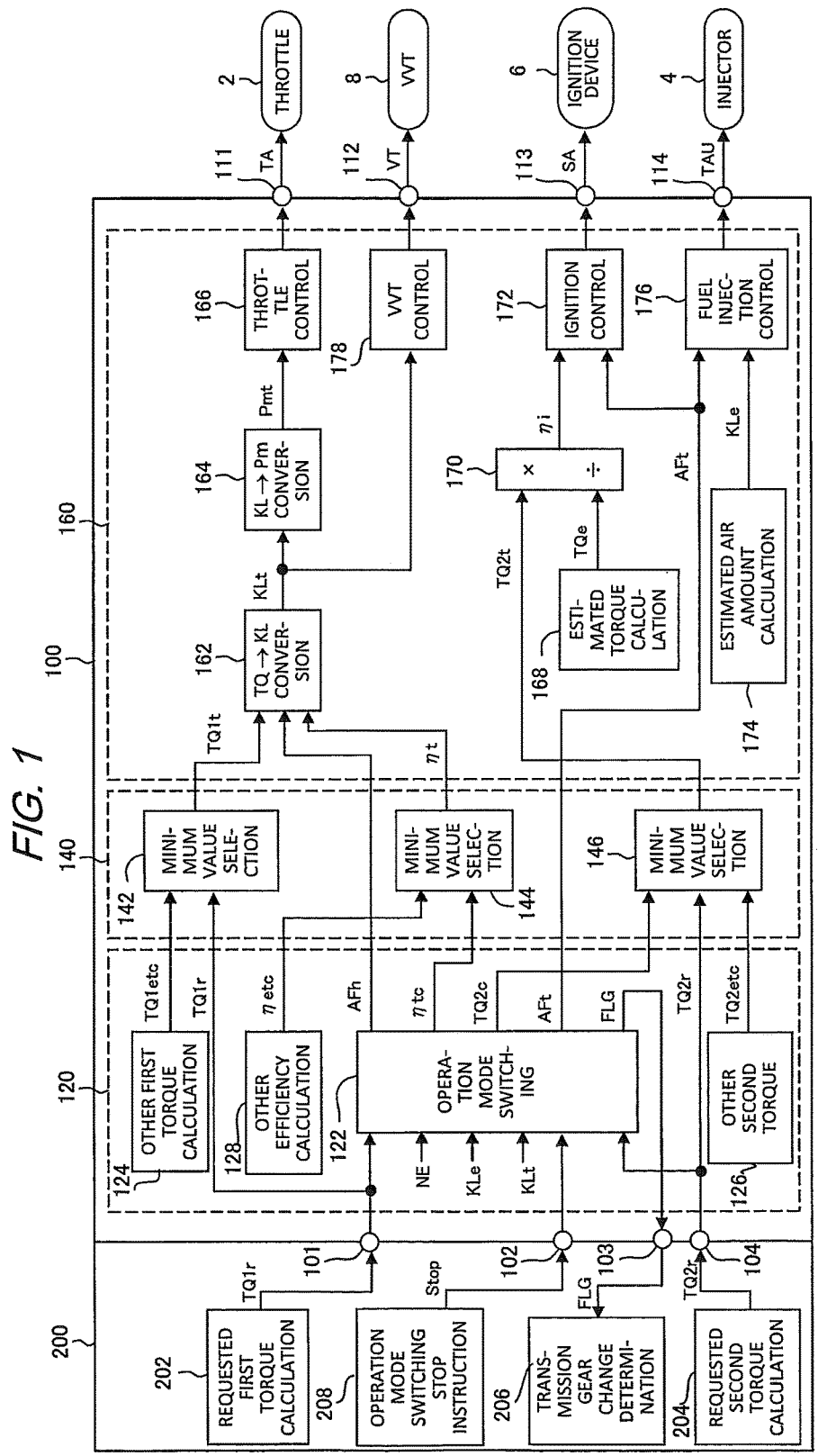
FIG. 1 is a block diagram illustrating the logic of a control device according to Embodiment 1 of the present invention.

In FIG. 1, the logic of the ECU according to the present embodiment is illustrated in a block diagram. The ECU includes an engine controller 100 and a powertrain manager 200. The engine controller 100 is a control device that directly controls the engine, and corresponds to the control device according to the present invention. The powertrain manager 200 is a control device that performs integrated control of the entire driving system that includes the engine, an electronically controlled automatic transmission, and also vehicle control devices such as a VSC and a TRC. The engine controller 100 is configured to control operation of the engine based on signals received from the powertrain manager 200. The engine controller 100 and powertrain manager 200 are each realized by software. More specifically, the respective functions of the engine controller 100 and the powertrain manager 200 are realized in the ECU by reading programs stored in a memory and executing the programs using a processor. Note that, in a case where the ECU is equipped with a multi-core processor, the engine controller 100 and the powertrain manager 200 can be allocated to different cores or groups of cores, respectively.

In the block showing the powertrain manager 200 in FIG. 1, among various functions that the powertrain manager 200 is equipped with, some of the functions relating to control of the engine are represented by blocks. An arithmetic unit is allocated to each of these blocks. A program corresponding to each block is prepared in the ECU, and the functions of the respective arithmetic units are realized in the ECU by executing the programs using a processor. Note that, in a case where the ECU is equipped with a multi-core processor, the arithmetic units constituting the powertrain manager 200 can be dispersed and allocated to a plurality of cores.

An arithmetic unit 202 calculates a requested first torque and sends the calculated value to the engine controller 100. In FIG. 1, the requested first torque is described as "TQ1$r$". The first torque is a torque of a kind with respect to which the responsiveness required of the engine is not high and which it is sufficient to realize in the near future and need not be realized immediately. The requested first torque is a requested value of the first torque that the powertrain manager 200 requests with respect to the engine, and corresponds to the requested torque in the present invention. A signal corresponding to the state of the opening degree of the accelerator pedal that is output from an unshown accelerator position sensor is input to the arithmetic unit 202. The requested first torque is calculated based on the aforementioned signal. Note that the requested first torque is a shaft torque.

An arithmetic unit 204 calculates a requested second torque and sends the calculated value to the engine controller 100. In FIG. 1, the requested second torque is described as "TQ2$r$". The second torque is a torque of a kind with respect to which the urgency or priority is higher than the first torque and for which a high responsiveness is required of the engine. That is, the second torque is of a kind which is required to be realized immediately. The term "responsiveness" used here refers to the responsiveness when the torque is temporarily decreased. The requested second torque is a requested value of the second torque that the powertrain manager 200 requests with respect to the engine. The requested second torque that is calculated by the arithmetic unit 204 includes various kinds of torques requested from the vehicle control system, such as a torque requested for transmission control of the electronically controlled automatic transmission, a torque requested for traction control, and a torque requested for sideslip prevention control. While the first torque is a torque that the engine is required to generate steadily or over an extended period, the second torque is a torque that the engine is required to generate suddenly or during a short period. Therefore, the arithmetic unit 204 outputs a valid value that is in accordance with the size of the torque that it is desired to realize only in a case where an event has actually occurred in which such a torque is required, and outputs an invalid value during a period in which such an event does not occur. The invalid value is set to a value that is larger than the maximum shaft torque that the engine can output.

An arithmetic unit 206 calculates a transmission gear ratio of the automatic transmission, and sends a signal indicating the transmission gear ratio to an unshown transmission controller. The transmission controller is realized as one function of the ECU, similarly to the powertrain manager 200 and the engine controller 100. A flag signal from the engine controller 100 is input to the arithmetic unit 206. In the drawings, the flag signal is described as "FLG". The flag signal is a signal that indicates that the state is one in which switching of the operation mode is being performed. During a period in which the flag signal is "on", the arithmetic unit 206 fixes the transmission gear ratio of the automatic transmission. That is, during a period in which switching of the operation mode is being performed, changing of the transmission gear ratio by the automatic transmission is prohibited so that the operating state of the engine does not change significantly.

In response to a predetermined condition being satisfied, an arithmetic unit 208 sends a stop signal to the engine controller 100 that instructs the engine controller 100 to stop switching of the operation mode. In the drawings, the stop signal is described as "Stop". The predetermined condition is that a request to significantly change the operating state of the engine is output from the powertrain manager 200. For example, the stop signal is output from the arithmetic unit 208 in a case where the transmission gear ratio of the automatic transmission is changed, or a case where a special request relating to the ignition timing or a fuel injection amount is output to the engine for the purpose of warming up a catalyst.

Next, the configuration of the engine controller 100 will be described. Interfaces 101, 102, 103 and 104 are arranged between the engine controller 100 and the powertrain manager 200. The interface 101 corresponds to requested torque reception means in the present invention. The requested first torque is passed at the interface 101. The stop signal is passed at the interface 102. The flag signal is passed at the interface 103. The requested second torque is passed at the interface 104.

In the block illustrating the engine controller 100 in FIG. 1, among the various functions with which the engine controller 100 is equipped, functions relating to coordinated operations of the three kinds of actuators, that is, a throttle 2 and a VVT 8 as first actuators, an injector 4 as a second actuator, and an ignition device 6 as a third actuator are represented with blocks. An arithmetic unit is allocated to each of these blocks. A program corresponding to each block is prepared in the ECU, and the functions of the respective arithmetic units are realized in the ECU by executing the programs using a processor. Note that, in a case where the ECU is equipped with a multi-core processor, the arithmetic units constituting the engine controller 100 can be dispersed and allocated to a plurality of cores.

The configuration of the engine controller 100 is broadly divided into three large arithmetic units 120, 140 and 160. The large arithmetic unit 120 calculates values of various control parameters with respect to the engine. Target values of various control amounts with respect to the engine are included in the control parameters. In addition, a value that is calculated based on a requested value that is sent from the powertrain manager 200, and a value that is calculated within the large arithmetic unit 120 based on information relating to the operating state of the engine are included in the target values. Note that, while a requested value is a value of a control amount that is unilaterally requested from the powertrain manager 200 without taking the state of the engine into consideration, a target value is a value of a control amount that is set based on a realizable range that is decided depending on the state of the engine. The large arithmetic unit 120 is, more specifically, constituted by four arithmetic units 122, 124, 126, and 128.

The arithmetic unit 122 calculates, as control parameters for the engine, a target air-fuel ratio, a virtual air-fuel ratio, a target efficiency for switching and a target second torque for switching. In the drawings, the target air-fuel ratio is described as "AFt", the virtual air-fuel ratio is described as "AFh", the target efficiency for switching is described as "ηtc" and the target second torque for switching is described as "TQ2c". The target air-fuel ratio is a target value of the air-fuel ratio to be realized by the engine, and is used for calculating a fuel injection amount. On the other hand, the virtual air-fuel ratio is a parameter that provides a conversion efficiency of an air amount to the torque, and is used for calculating a target air amount. The target efficiency for switching is a target value of the ignition timing efficiency for switching of the operation mode, and is used for calculating the target air amount. The term "ignition timing efficiency" refers to the proportion of torque that is actually output with respect to the torque that can be output when the ignition timing is the optimal ignition timing. When the ignition timing is the optimal ignition timing, the ignition timing efficiency is 1 that is the maximum value thereof. Note that the term "optimal ignition timing" fundamentally refers to the MBT (minimum advance for best torque), and when a trace knock ignition timing is set, the term "optimal ignition timing" refers to the ignition timing that is located further on the retardation side among the MBT and the trace knock ignition timing. The target second torque for switching is a target value of the second torque for switching of the operation mode, and is used to switch the calculation of the ignition timing efficiency when switching the operation mode. Switching of the operation mode is executed by combining the values of these control parameters that are calculated with the arithmetic unit 122. The relation between the contents of the processing performed by the arithmetic unit 122 and switching of the operation mode will be described in detail later.

In addition to the requested first torque, the requested second torque, and the stop signal that are received from the powertrain manager 200, various kinds of information relating to the operating state of the engine such as the number of engine revolutions is also input to the arithmetic unit 122. Among these various kinds of information, the requested first torque is used as information for determining the timing for switching the operation mode. The requested second torque and the stop signal are used as information for determining whether switching of the operation mode is permitted or prohibited. When the stop signal is input, and when the requested second torque of a valid value is input, the arithmetic unit 122 does not execute processing relating to switching the operation mode. Further, during switching of the operation mode, that is, while executing calculation processing for switching the operation mode, the arithmetic unit 122 sends the aforementioned flag signal to the powertrain manager 200.

The arithmetic unit 124 calculates, as a control parameter for the engine, a torque that is classified as a first torque among torques that are necessary for maintaining the current operating state of the engine or for realizing a scheduled predetermined operating state. In this case, a torque that is calculated by the arithmetic unit 124 is referred to as "other first torque". In the drawings, the other first torque is described as "TQ1etc". A torque that is in a range of variations that are achievable by only control of the air amount among torques that are required in order to maintain a predetermined idling speed in a case where the engine is in an idling state is included in the kinds of the other first torque. The arithmetic unit 124 outputs a valid value only in a case where such a torque is actually required, and calculates an invalid value during a period in which such a torque is not required. The invalid value is set to a value that is greater than the maximum indicated torque that the engine can output.

The arithmetic unit 126 calculates, as a control parameter for the engine, a torque that is classified as a second torque among torques that are necessary for maintaining the current operating state of the engine or for realizing a scheduled predetermined operating state. In this case, a torque that is calculated by the arithmetic unit 126 is referred to as "other second torque". In the drawings, the other second torque is described as "TQ2etc". A torque for which it is necessary to perform control of the ignition timing in order to achieve the relevant torque among torques that are required in order to maintain a predetermined idling speed in a case where the engine is in an idling state is included in the kinds of the other second torque. The arithmetic unit 126 outputs a valid value only in a case where such a torque is actually required, and calculates an invalid value during a period in which such a torque is not required. The invalid value is set to a value that is greater than the maximum indicated torque that the engine can output.

The arithmetic unit 128 calculates, as a control parameter for the engine, an ignition timing efficiency that is necessary for maintaining the current operating state of the engine or for realizing a scheduled predetermined operating state. In this case, an ignition timing efficiency that is calculated by the arithmetic unit 128 is referred to as "other efficiency". In the drawings, the other efficiency is described as "ηetc". An ignition timing efficiency that is necessary for warming up an exhaust purification catalyst when starting the engine is included in the kinds of the other efficiency. The more the ignition timing efficiency is lowered, the less the amount of energy that is converted to torque will be among the energy generated by the combustion of fuel, and thus an amount of energy that is increased by an amount corresponding to the decrease in the energy converted to torque will be discharged to the exhaust passage together with the exhaust gas and used to warm up the exhaust purification catalyst. Note that, during a period in which it is not necessary to realize such efficiency, the efficiency value that is output from the arithmetic unit 128 is held at a value of 1 that is the maximum value.

The requested first torque, the other first torque, the target air-fuel ratio, the virtual air-fuel ratio, the target efficiency for switching, the other efficiency, the requested second torque, the target second torque for switching, and the other second torque are output from the large arithmetic unit 120 configured as described above. These control parameters are input to the large arithmetic unit 140. Note that, although the requested first torque and the requested second torque that are received from the powertrain manager 200 are shaft torques, correction of these torques into indicated torques is performed at the large arithmetic unit 120. Correction of the requested torque to the indicated torque is performed by adding or subtracting a friction torque, an auxiliary driving torque and a pump loss to or from the requested torque. Note that, torques such as the target second torque for switching that are calculated within the large arithmetic unit 120 are each calculated as an indicated torque.

Next, the large arithmetic unit 140 will be described. As described above, various engine control parameters are sent to the large arithmetic unit 140 from the large arithmetic unit 120. Among these, the requested first torque and the other first torque are requests with respect to control amounts that belong to the same category, and these cannot be realized simultaneously. Likewise, the requested second torque, the other second torque and the target second torque for switching are requests with respect to control amounts that belong to the same category, and these cannot be realized simultaneously. Similarly, the target efficiency for switching and the other efficiency are requests with respect to control amounts that belong to the same category, and these cannot be realized simultaneously. Consequently, processing is necessary that performs a mediation process for each control amount category. As used herein, the term "mediation" refers to a computation process for obtaining a single numerical value from a plurality of numerical values, such as, for example, selecting a maximum value, selecting a minimum value, averaging, or superimposing, and a configuration can also be adopted in which the mediation process appropriately combines a plurality of kinds of computation processes. The large arithmetic unit 140 includes three arithmetic units 142, 144, and 146 in order to execute such kind of mediation for each control amount category.

The arithmetic unit 142 is configured to perform a mediation process with respect to the first torque. The requested first torque and the other first torque are input to the arithmetic unit 142. The arithmetic unit 142 performs a mediation process on these values, and outputs a torque that is obtained as the mediation result as a target first torque that is finally determined. In FIG. 1, the target first torque that is finally determined is described as "TQ1t". Minimum value selection is used as the mediation method in the arithmetic unit 142. Accordingly, in a case where a valid value is not output from the arithmetic unit 124, the requested first torque that is provided from the powertrain manager 200 is calculated as the target first torque.

The arithmetic unit 144 is configured to perform a mediation process with respect to the ignition timing efficiency. The target efficiency for switching and the other efficiency are input to the arithmetic unit 144. The arithmetic unit 144 performs a mediation process on these values, and outputs an efficiency that is obtained as the mediation result as a target efficiency that is finally determined. In FIG. 1, the target efficiency that is finally determined is described as "ηt". Minimum value selection is used as the mediation method in the arithmetic unit 144. From the viewpoint of fuel consumption performance, it is preferable that the ignition timing efficiency is 1 that is the maximum value thereof. Therefore, as long as no special event occurs, the target efficiency for switching that is calculated by the arithmetic unit 122 and the other efficiency that is calculated by the arithmetic unit 128 are each maintained at a value of 1 that is the maximum value. Accordingly, the value of the target efficiency that is output from the arithmetic unit 144 is fundamentally 1, and a value that is less than 1 is only selected in a case where an event of some kind has occurred.

The arithmetic unit 146 is configured to perform a mediation process with respect to the second torque. The requested second torque, the other second torque, and the target second torque for switching are input to the arithmetic unit 146. The arithmetic unit 146 performs a mediation process on these values, and outputs a torque that is obtained as the mediation result as a target second torque that is finally determined. In FIG. 1, the target second torque that is finally determined is described as "TQ2t". Minimum value selection is used as the mediation method in the arithmetic unit 146. The second torque, including the target second torque for switching, is fundamentally an invalid value, and is switched to a valid value showing the size of the torque it is desired to realize only in a case where a specific event has occurred. Accordingly, the target second torque that is output from the arithmetic unit 146 is also fundamentally an invalid value, and a valid value is selected in only a case where an event of some kind has occurred.

The target first torque, the target efficiency, the virtual air-fuel ratio, the target air-fuel ratio, and the target second torque are output from the large arithmetic unit 140 that is configured as described above. These control parameters are input to the large arithmetic unit 160.

The large arithmetic unit 160 corresponds to an inverse model of the engine, and is constituted by a plurality of models that are represented by a map or a function. Operation amounts of the respective actuators 2, 4, 6, and 8 for coordinated operations are calculated by the large arithmetic unit 160. Among the control parameters that are input from the large arithmetic unit 140, the target first torque and the target second torque are each handled as target values of the torque with respect to the engine. However, the target second torque takes priority over the target first torque. In the large arithmetic unit 160, calculation of operation amounts of the respective actuators 2, 4, 6, and 8 is performed so as to achieve the target second torque in a case where the target second torque is a valid value, or so as to achieve the target first torque in a case where the target second torque is an invalid value. Calculation of the operation amounts is performed so as to also achieve the target air-fuel ratio and the target efficiency simultaneously with the target torque. That is, according to the control device of the present embodiment, the torque, the efficiency and the air-fuel ratio are used as engine control amounts, and air amount control, ignition timing control and fuel injection amount control are conducted based on the target values of these three kinds of control amounts.

The large arithmetic unit 160 includes a plurality of arithmetic units 162, 164, 166, 168, 170, 172, 174, 176, and 178. Among these arithmetic units, the arithmetic units 162, 164, 166, and 178 relate to air amount control, the arithmetic units 168, 170, and 172 relate to ignition timing control, and the arithmetic units 174 and 176 relate to fuel injection amount control. Hereunder, the functions of the respective arithmetic units are described in detail in order, starting from the arithmetic units relating to air amount control.

The target first torque, the target efficiency and the virtual air-fuel ratio are input to the arithmetic unit 162. The arithmetic unit 162 corresponds to target air amount calculation means of the present invention, and uses the target efficiency and the virtual air-fuel ratio to back-calculate a target air amount for achieving the target first torque from the target first torque. In this calculation, the target efficiency and the virtual air-fuel ratio are used as parameters that provide a conversion efficiency of the air amount to torque. Note that, in the present invention, the term "air amount" refers to the amount of air that is drawn into the cylinders, and a charging efficiency or a load factor, which are non-dimensional equivalents of the air amount, is within an equal range to the air amount in the present invention.

The arithmetic unit 162 first calculates a target torque for air amount control by dividing the target first torque by the target efficiency. If the target efficiency is less than 1, the target torque for air amount control becomes larger than the target first torque. This means that a requirement with respect to the air amount control by the actuators 2 and 8 is to enable the potential output of torque that is greater than the target first torque. On the other hand, if the target efficiency is 1, the target first torque is calculated as it is as the target torque for air amount control.

Next, the arithmetic unit 162 converts the target torque for air amount control to a target air amount using a torque-air amount conversion map. The torque-air amount conversion map is prepared on the premise that the ignition timing is the optimal ignition timing, and is a map in which the torque and the air amount are associated using various engine status amounts, such as the number of engine revolutions and the air-fuel ratio, as keys. This map is created based on data obtained by testing the engine. Actual values or target values of the engine status amounts are used to search the torque-air amount conversion map. With regard to the air-fuel ratio, the virtual air-fuel ratio is used to search the map. Accordingly, at the arithmetic unit 162, the air amount that is required to realize the target torque for air amount control under the virtual air-fuel ratio is calculated as the target air amount. In the drawings, the target air amount is described as "KLt".

The arithmetic unit 164 back-calculates a target intake pipe pressure that is a target value of the intake pipe pressure from the target air amount. A map that describes the relation between an air amount that is drawn into the cylinders through the intake valve and the intake pipe pressure is used to calculate the target intake pipe pressure. The relation between the air amount and the intake pipe pressure changes depending on the valve timing. Therefore, when calculating the target intake pipe pressure, a parameter value of the aforementioned map is determined based on the current valve timing. The target intake pipe pressure is described as "Pmt" in the drawings.

The arithmetic unit 166 calculates a target throttle opening degree that is a target value of the throttle opening degree based on the target intake pipe pressure. An inverse model of the air model is used to calculate the target throttle opening degree. The air model is a physical model which is obtained as the result of modeling the response characteristic of the intake pipe pressure with respect to operation of the throttle 2. Therefore, the target throttle opening degree that is required to achieve the target intake pipe pressure can be back-calculated from the target intake pipe pressure using the inverse model thereof. The target throttle opening degree is described as "TA" in the drawings. The target throttle opening degree calculated by the arithmetic unit 166 is converted to a signal for driving the throttle 2, and is sent to the throttle 2 through an interface 111 of the ECU. The arithmetic units 164 and 166 correspond to first actuator control means according to the present invention.

The arithmetic unit 178 calculates a target valve timing that is a target value of the valve timing based on the target air amount. A map in which the air amount and the valve timing are associated using the number of engine revolutions as an argument is utilized to calculate the target valve timing. The target valve timing is the optimal displacement angle of the VVT 8 for achieving the target air amount under the current number of engine revolutions, and the specific value thereof is determined by adaptation for each air amount and each number of engine revolutions. However, at a time of acceleration at which the target air amount increases by a large amount at a fast speed, correction of the target valve timing to the advanced side relative to a valve timing that is determined based on the map is performed so as to increase the actual air amount at the maximum speed to cause the actual air amount to track the target air amount. The target valve timing is described as "VT" in the drawings. The target valve timing calculated by the arithmetic unit 178 is converted to a signal for driving the VVT 8, and is sent to the VVT 8 through an interface 112 of the ECU.

The arithmetic unit 178 also corresponds to first actuator control means in the present invention.

Next, the functions of the arithmetic units relating to ignition timing control will be described. The arithmetic unit 168 calculates an estimated torque based on the actual throttle opening degree realized by the above described air amount control and the valve timing. The term "estimated torque" as used in the present description refers to torque that can be output in a case where the ignition timing is set to the optimal ignition timing under the current throttle opening degree and valve timing and the target air-fuel ratio. The arithmetic unit 168 first calculates an estimated air amount based on a measured value of the throttle opening degree and a measured value of the valve timing using a forward model of the aforementioned air model. The estimated air amount is an estimated value of an air amount that is actually realized by the current throttle opening degree and valve timing. Next, the arithmetic unit 168 converts the estimated air amount to an estimated torque using the torque-air amount conversion map. The target air-fuel ratio is used as a search key when searching the torque-air amount conversion map. The estimated torque is described as "TQe" in the drawings.

The target second torque and the estimated torque are input to the arithmetic unit 170. The arithmetic unit 170 calculates an indicated ignition timing efficiency that is an indicated value of the ignition timing efficiency based on the target second torque and the estimated torque. The indicated ignition timing efficiency is expressed as a proportion of the target second torque with respect to the estimated torque. However, an upper limit is defined for the indicated ignition timing efficiency, and the value of the indicated ignition timing efficiency is set as 1 in a case where the proportion of the target second torque with respect to the estimated torque exceeds 1. The indicated ignition timing efficiency is described as "ηi" in the drawings.

The arithmetic unit 172 calculates the ignition timing based on the indicated ignition timing efficiency. More specifically, the arithmetic unit 172 calculates the optimal ignition timing based on engine status amounts such as the number of engine revolutions, the requested torque and the air-fuel ratio, and calculates a retardation amount with respect to the optimal ignition timing based on the indicated ignition timing efficiency. When the indicated ignition timing efficiency is 1, the retardation amount is set as zero, and the retardation amount is progressively increased as the indicated ignition timing efficiency decreases from 1. The arithmetic unit 172 then calculates the result obtained by adding the retardation amount to the optimal ignition timing as a final ignition timing. However, the final ignition timing is restricted by a retardation limit guard. The term "retardation limit" refers to the most retarded ignition timing at which it is guaranteed that misfiring will not occur, and the retardation limit guard guards the final ignition timing so that the ignition timing is not retarded beyond the retardation limit. A map in which the optimal ignition timing and various engine status amounts are associated can be used to calculate the optimal ignition timing. A map in which the retardation amount, the ignition timing efficiency and various engine status amounts are associated can be used to calculate the retardation amount. The target air-fuel ratio is used as a search key to search these maps. The ignition timing is described as "SA" in the drawings. The ignition timing that is calculated by the arithmetic unit 172 is converted to a signal for driving the ignition device 6, and is sent to the ignition device 6 through an interface 113 of the ECU. The arithmetic units 168, 170 and 172 correspond to third actuator control means in the present invention.

Next, functions of the arithmetic units relating to fuel injection amount control will be described. The arithmetic unit 174 calculates an estimated air amount based on a measured value of the throttle opening degree and a measured value of the valve timing using the forward model of the air model described above. The estimated air amount that is calculated by the arithmetic unit 174 is preferably an air amount that is predicted to arise at a timing at which the intake valve closes. An air amount that will arise in the future can be predicted, for example, based on the target throttle opening degree by setting a delay time period from calculation of the target throttle opening degree until the output thereof. The estimated air amount is described as "KU" in the drawings.

The arithmetic unit 176 calculates a fuel injection amount, that is, a fuel supply amount, which is required to achieve the target air-fuel ratio based on the target air-fuel ratio and the estimated air amount. Calculation of the fuel injection amount is executed when the timing for calculating a fuel injection amount arrives with respect to each cylinder. The fuel injection amount is described as "TAU" in the drawings. The fuel injection amount that is calculated by the arithmetic unit 176 is converted to a signal for driving the injector 4, and is sent to the injector 4 through an interface 114 of the ECU. The arithmetic units 174 and 176 correspond to second actuator control means in the present invention.

The foregoing is an overview of the logic of the ECU according to the present embodiment. Next, the arithmetic unit 122 that is a main portion of the ECU according to the present embodiment will be described in detail.

Figure 2:
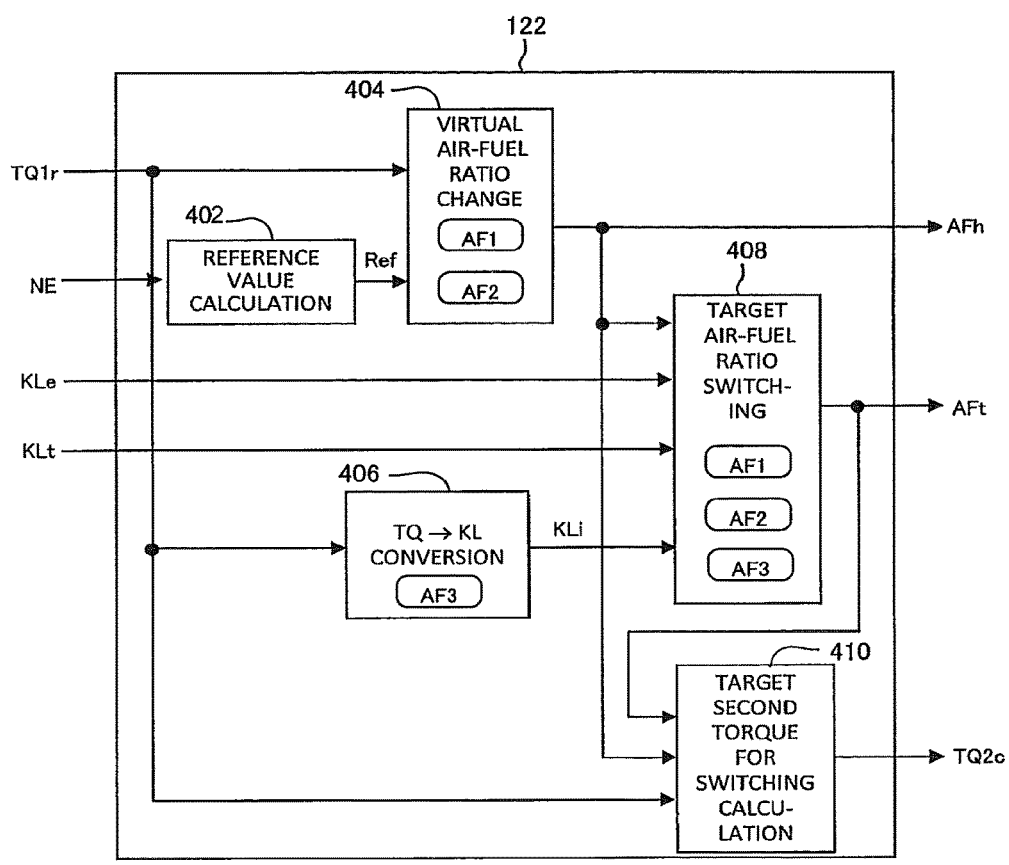
FIG. 2 is a block diagram illustrating the logic for switching an operation mode of the control device according to Embodiment 1 of the present invention.

The logic of the arithmetic unit 122 is illustrated by means of a block diagram in FIG. 2. Inside the block illustrating the arithmetic unit 122 in FIG. 2, among the various functions that the arithmetic unit 122 is equipped with, functions relating to switching of the operation mode are represented by blocks. An arithmetic unit is allocated to these blocks, respectively. A program corresponding to each block is prepared in the ECU, and the functions of the respective arithmetic units are realized in the ECU by executing the programs using a processor. Note that, in a case where the ECU is equipped with a multi-core processor, arithmetic units 402, 404, 406, 408 and 410 constituting the arithmetic unit 122 can be dispersed and allocated to a plurality of cores.

First, the arithmetic unit 402 will be described. The arithmetic unit 402 calculates a reference value for the torque. The reference value is a torque that serves as a boundary between a lean mode and a stoichiometric mode, and the optimal value is adapted for each number of engine revolutions from the viewpoint of fuel consumption performance, exhaust gas performance and drivability. The arithmetic unit 402 refers to a previously prepared map to calculate a reference value that is suitable for the number of engine revolutions. The reference value is described as "Ref" in the drawings.

Next, the arithmetic unit 404 will be described. The requested first torque is input to the arithmetic unit 404. In addition, the reference value calculated by the arithmetic unit 402 is set with respect to the arithmetic unit 404. The arithmetic unit 404 changes a value of the virtual air-fuel ratio that is used to calculate the target air amount, based on the relation between the requested first torque and the reference value that are input. More specifically, the arithmetic unit 404 switches the virtual air-fuel ratio from a first air-fuel ratio to a second air-fuel ratio or from the second air-fuel ratio to the first air-fuel ratio. The first air-fuel ratio is the theoretical air-fuel ratio (for example, 14.5). The first air-fuel ratio is described as "AF1" in the drawings. The second air-fuel ratio is a leaner air-fuel ratio than the first air-fuel ratio, and is set to a certain fixed value (for example, 22.0). The second air-fuel ratio is described as "AF2" in the drawings. The arithmetic unit 404 corresponds to virtual air-fuel ratio changing means in the present invention. During a period in which the requested first torque is greater than the reference value, the arithmetic unit 404 sets the virtual air-fuel ratio to the first air-fuel ratio in response to the requested first torque being greater than the reference value. If the requested first torque decreases in accordance with a deceleration request of the driver and in due course becomes less than the reference value, the arithmetic unit 404 switches the virtual air-fuel ratio from the first air-fuel ratio to the second air-fuel ratio in response to the requested first torque decreasing to a value that is less than or equal to the reference value.

Next, the arithmetic unit 406 will be described. The requested first torque is input to the arithmetic unit 406. The arithmetic unit 406 converts the requested first torque to an air amount using the torque-air amount conversion map. A third air-fuel ratio that is an air-fuel ratio that lies between the first air-fuel ratio and the second air-fuel ratio, that is, an air-fuel ratio that is leaner than the first air-fuel ratio and is richer than the second air-fuel ratio, is used to search the torque-air amount conversion map. The third air-fuel ratio is described as "AF3" in the drawings. Accordingly, an air amount that is necessary to realize the requested first torque under the third air-fuel ratio is calculated by the arithmetic unit 406. Hereunder, the air amount that is calculated by the arithmetic unit 406 is referred to as "intermediate air amount" and is described as "KLi" in the drawings.

Next, the arithmetic unit 408 will be described. Together with the arithmetic unit 406, the arithmetic unit 408 constitutes target air-fuel ratio switching means in the present invention. The first air-fuel ratio that is used in the stoichiometric mode and the second air-fuel ratio that is used in the lean mode are previously set as default values of the target air-fuel ratio in the arithmetic unit 408. In addition, the third air-fuel ratio that is an intermediate air-fuel ratio is previously set therein. A specific value of the third air-fuel ratio is determined by adaptation based on the relation with the retardation limit of the ignition timing and the relation with the exhaust performance. The virtual air-fuel ratio determined by the arithmetic unit 404, the intermediate air amount calculated by the arithmetic unit 406, a value of the target air amount calculated in a previous step by the arithmetic unit 162, a value of the estimated air amount calculated in a previous step by the arithmetic unit 174 are inputted to the arithmetic unit 408.

Upon detecting that the virtual air-fuel ratio that is input from the arithmetic unit 404 was switched from the first air-fuel ratio to the second air-fuel ratio, the arithmetic unit 408 performs a comparison between the intermediate air amount and the estimated air amount for each control step. Immediately after the virtual air-fuel ratio is switched from the first air-fuel ratio to the second air-fuel ratio, the estimated air amount becomes a smaller value than the intermediate air amount. When the estimated air amount arrives at the intermediate air amount in due course, the arithmetic unit 408 switches the target air-fuel ratio from the first air-fuel ratio to the third air-fuel ratio. Next, the arithmetic unit 408 calculates a difference between the target air amount and the estimated air amount for each control step. Subsequently, when the estimated air amount becomes sufficiently near to the target air amount, specifically, when the difference between the target air amount and the estimated air amount becomes less than or equal to a predetermined threshold value, the arithmetic unit 408 switches the target air-fuel ratio from the third air-fuel ratio to the second air-fuel ratio. That is, after switching of the virtual air-fuel ratio from the first air-fuel ratio to the second air-fuel ratio, the target air-fuel ratio is temporarily switched from the first air-fuel ratio to the third air-fuel ratio that is the intermediate air-fuel ratio, and is switched via the third air-fuel ratio to the second air-fuel ratio. The operation mode is thus switched from the stoichiometric mode to the lean mode by such switching of the target air-fuel ratio.

Finally the arithmetic unit 410 will be described. The arithmetic unit 410 calculates the target second torque for switching. As described above, the target second torque for switching is input to the arithmetic unit 146 together with the requested second torque and the other second torque, and the smallest value among those values is selected by the arithmetic unit 146. The requested second torque and the other second torque are normally invalid values, and are switched to valid values only in a case where a special event has occurred. The same applies with respect to the target second torque for switching also, and the arithmetic unit 410 normally sets the output value of the target second torque for switching to an invalid value.

The requested first torque, the target air-fuel ratio, and the virtual air-fuel ratio are input to the arithmetic unit 410. According to the logic of the arithmetic units 404 and 408, the target air-fuel ratio and the virtual air-fuel ratio match before processing to switch the operation mode begins, and also match after the switching processing is completed. However, during the processing to switch the operation mode, the target air-fuel ratio and the virtual air-fuel ratio diverge from each other. The arithmetic unit 410 calculates the target second torque for switching that has a valid value, only during a period in which the target air-fuel ratio and the virtual air-fuel ratio diverge from each other. In this case, the requested first torque is used as the valid value of the target second torque for switching. That is, during a period in which the target air-fuel ratio and the virtual air-fuel ratio diverge from each other, the requested first torque is output from the arithmetic unit 410 as the target second torque for switching.

The foregoing is a detailed description of the logic of the arithmetic unit 122, that is, the logic for switching the operation mode that is adopted in the present embodiment. Next, control results in a case where engine control is executed in accordance with the above described logic will be described and contrasted with control results obtained according to a comparative example. According to the comparative example, with respect to the logic of the control device illustrated in FIG. 1, after the virtual air-fuel ratio is changed from the first air-fuel ratio to the second air-fuel ratio, the target air-fuel ratio is directly switched from the first air-fuel ratio to the second air-fuel ratio.

Figure 3:
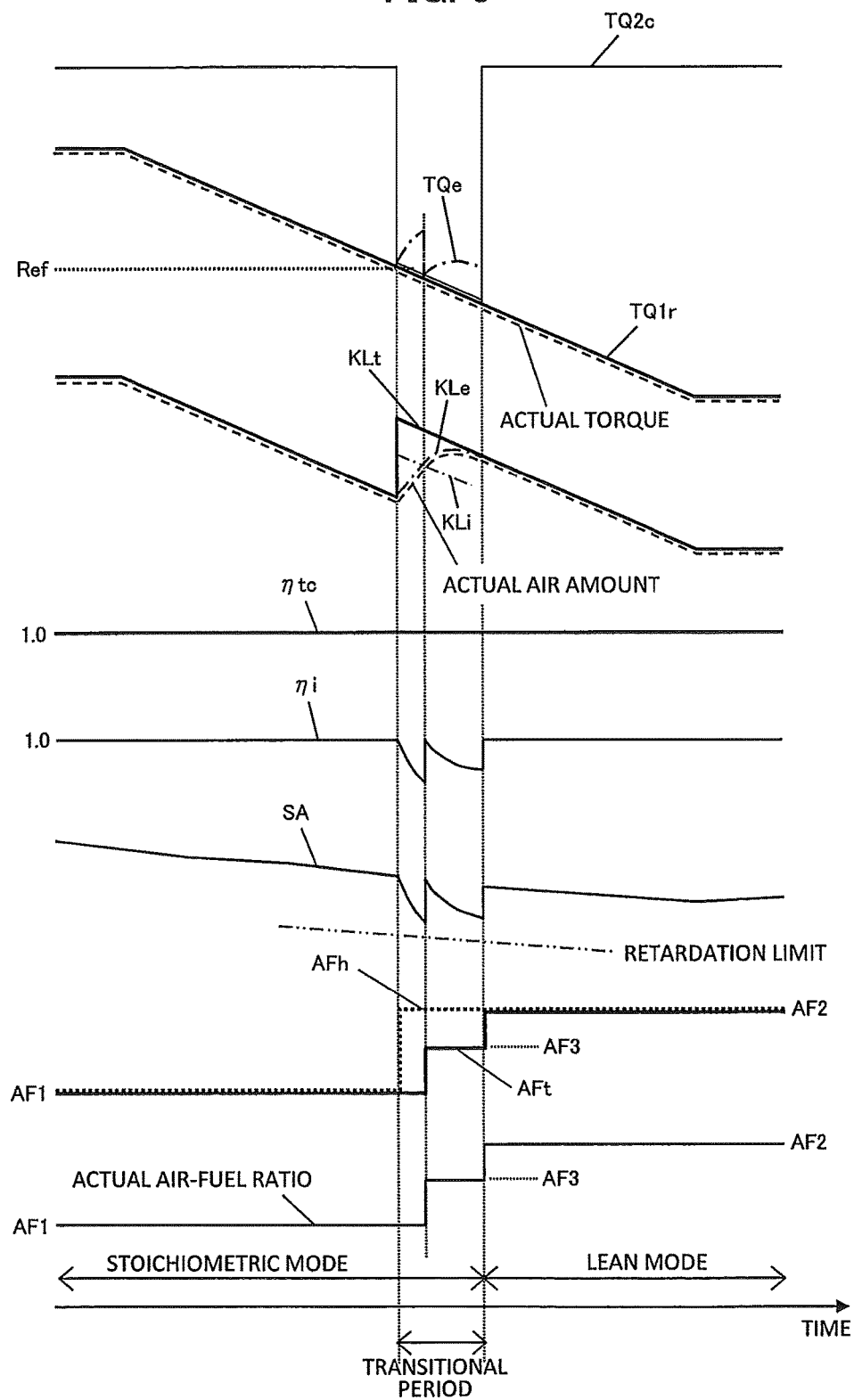
FIG. 3 is a time chart that illustrates an image of results of control performed by the control device according to Embodiment 1 of the present invention.
Figure 4:
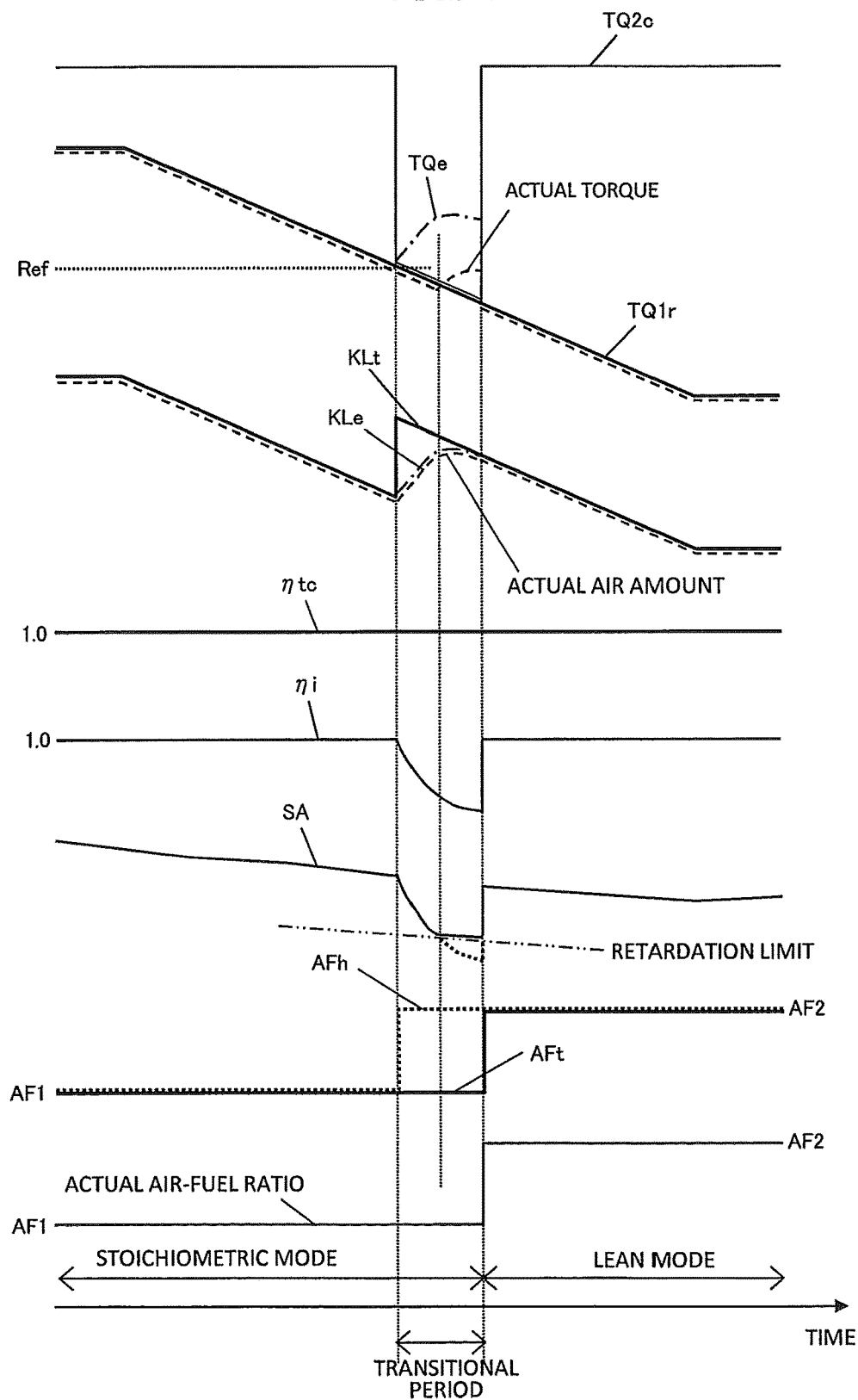
FIG. 4 is a time chart that illustrates an image of results of control according to a comparative example.

FIG. 3 is a time chart that illustrates an image of results of control performed by the ECU according to the present embodiment. FIG. 4 is a time chart that illustrates an image of results of control performed according to a comparative example. In each of FIG. 3 and FIG. 4, a chart on the first (upper) level illustrates changes over time in the torque. As described above, reference character "TQ1r" denotes the requested first torque, reference character "TQ2c" denotes the target second torque for switching, and reference character "TQe" denotes the estimated torque. Note that, in this case the requested first torque is the final target first torque, and the target second torque for switching is the final target second torque. Further, in addition to these torques, the actual torque is represented by a dashed line on the chart. However, the actual torque is not measured during the actual engine control. The line for the actual torque that is shown in the chart is an image line that is supported by test results.

A chart on the second level from the top in FIG. 3 and FIG. 4 illustrates changes over time in the air amount. As described above, reference character "KU" denotes the target air amount, reference character "KLe" denotes the estimated air amount, and reference character "KLi" denotes the intermediate air amount. In addition to these air amounts, the actual air amount is represented by a dashed line in the chart. However, the actual air amount is not measured during the actual engine control. The line for the actual air amount that is shown in the chart is an image that is supported by test results.

A chart on the third level from the top in FIG. 3 and FIG. 4 illustrates changes over time in the target efficiency for switching. As described above, reference character "ηtc" denotes the target efficiency for switching. Note that, in this case the target efficiency for switching is the final target efficiency.

A chart on the fourth level from the top in FIG. 3 and FIG. 4 illustrates changes over time in the indicated ignition timing efficiency. As described above, reference character "ηi" denotes the indicated ignition timing efficiency.

A chart on the fifth level from the top in FIG. 3 and FIG. 4 illustrates changes over time in the ignition timing. As described above, reference character "SA" denotes the ignition timing. The retardation limit of the ignition timing is represented by a chain double-dashed line in the chart. Further, in the chart illustrated in FIG. 4, changes over time in the ignition timing in a case where the ignition timing is not guarded with a retardation limit are represented by a dashed line.

A chart on the sixth level from the top in FIG. 3 and FIG. 4 illustrates changes over time in the air-fuel ratio. As described above, reference character "AFt" denotes the target air-fuel ratio, and reference character "AFh" denotes the virtual air-fuel ratio. Further, reference character "AF1" denotes the first air-fuel ratio, reference character "AF2" denotes the second air-fuel ratio and reference character "AF3" denotes the third air-fuel ratio. A chart on the seventh level from the top in FIG. 3 and FIG. 4 illustrates changes over time in the actual air-fuel ratio.

First, the control results according to the comparative example illustrated in FIG. 4 will be discussed. According to the comparative example, the virtual air-fuel ratio is switched from the first air-fuel ratio to the second air-fuel ratio prior to switching of the target air-fuel ratio from the first air-fuel ratio to the second air-fuel ratio. As a result of this switching, the target air amount increases in a step manner up to an air amount that is in accordance with the second air-fuel ratio, and the actual air amount increases by a large amount to track the target air amount. By increasing the target air amount prior to switching of the target air-fuel ratio in this way, it is possible to increase the air amount to an amount that is in accordance with the second air-fuel ratio by the time that the target air-fuel ratio is switched.

The air amount exceeds an air amount that is required to achieve the requested first torque by an amount by which the target air amount was increased prior to switching of the target air-fuel ratio. According to the logic illustrated in FIG. 1, an increase in the torque that is caused by the excess in the air amount is cancelled out by a decrease in the torque caused by retardation of the ignition timing. In this connection, since the ignition timing is restricted by a retardation limit by means of a guard function for preventing misfiring, the ignition timing cannot be retarded by the necessary amount, and it is not possible to avoid an increase in the torque that is caused by the excess in the air amount. Consequently, in the comparative example illustrated in FIG. 4, the actual torque temporarily becomes excessive relative to the requested first torque and therefore a smooth decrease in torque that is consistent with a deceleration request of the driver is impaired.

Next, results of control according to the logic that is adopted in the present embodiment will be described based on FIG. 3. At a time of deceleration, the target air-fuel ratio and the virtual air-fuel ratio are each maintained at the first air-fuel ratio that is the theoretical air-fuel ratio until the requested first torque decreases to the level of the reference value that is represented by "Ref". Hence, the target air amount that is calculated based on the requested first torque and the virtual air-fuel ratio decrease in response to a decrease in the requested first torque. During this period, the target second torque for switching is set to an invalid value in response to the target air-fuel ratio and the virtual air-fuel ratio matching. Since the indicated ignition timing efficiency becomes 1 when the target second torque for switching is an invalid value, the ignition timing is maintained at the optimal ignition timing. Note that, although the ignition timing in the chart changes in accordance with a decrease in the requested first torque, this is a change that corresponds to the optimal ignition timing changing depending on the number of engine revolutions or the air amount.

When the requested first torque becomes lower than the reference value, only the virtual air-fuel ratio is switched from the first air-fuel ratio to the second air-fuel ratio. That is, although the target air-fuel ratio is maintained at the theoretical air-fuel ratio, the virtual air-fuel ratio is made leaner in a step manner. Operation according to the second air-fuel ratio that is a lean air-fuel ratio requires a larger air amount than the air amount required for operation according to the first air-fuel ratio that is the theoretical air-fuel ratio. Therefore, when the virtual air-fuel ratio that is used for calculating the target air amount is switched in a step manner to the second air-fuel ratio, the target air amount also increases in a step manner at the time point of such switching. However, because there is a response delay until the actuator operates and the air amount changes, the actual air amount and the estimated air amount that is an estimated value thereof do not increase in a step manner, and increase with a delay relative to the target air amount. The actual air amount and the estimated air amount reach the intermediate air amount in due course, and at that time point the target air-fuel ratio is switched from the first air-fuel ratio to the third air-fuel ratio. The actual air amount and the estimated air amount increase further and gradually converge on the target air amount, and in due course a difference between the target air amount and the estimated air amount becomes less than or equal to the threshold value. At that time point the target air-fuel ratio is switched from the third air-fuel ratio to the second air-fuel ratio.

During a period from when the requested first torque becomes lower than the reference value and a divergence arises between the target air-fuel ratio and the virtual air-fuel ratio until the target air-fuel ratio and the virtual air-fuel ratio match once again, the target second torque for switching is set to the same value as the requested first torque that is a valid value. On the other hand, during a period in which the target air-fuel ratio is maintained at the first air-fuel ratio, the estimated torque that is calculated based on the estimated air amount and the target air-fuel ratio gradually increases compared to the requested first torque accompanying an increase in the estimated air amount that is caused by switching of the virtual air-fuel ratio from the first air-fuel ratio to the second air-fuel ratio. However, upon the target air-fuel ratio being switched from the first air-fuel ratio to the third air-fuel ratio that is a leaner air-fuel ratio than the first air-fuel ratio, the estimated torque decreases in a step manner. Because switching of the target air-fuel ratio from the first air-fuel ratio to the third air-fuel ratio is performed at a timing at which the estimated air amount reaches an air amount with which the requested first torque can be achieved under the third air-fuel ratio, the estimated torque matches the requested first torque immediately after switching of the target air-fuel ratio. Thereafter, accompanying a further increase in the estimated air amount towards the target air amount, the estimated torque gradually increases once again in comparison to the requested first torque. The estimated air amount converges on the target air amount in due course, and upon the target air-fuel ratio being switched from the third air-fuel ratio to the second air-fuel ratio, the estimated torque decreases in a step manner to match the requested first torque.

During a period from when the target air-fuel ratio and the virtual air-fuel ratio diverge from each other until the target air-fuel ratio and the virtual air-fuel ratio match once again, as a result of the estimated torque changing in as described above relative to the requested first torque, the indicated ignition timing efficiency that is the proportion of the target second torque for switching relative to the estimated torque becomes a value that is less than 1. More specifically, during a period from a time that the virtual air-fuel ratio is switched from the first air-fuel ratio to the second air-fuel ratio until a time that the target air-fuel ratio is switched from the first air-fuel ratio to the third air-fuel ratio, the indicated ignition timing efficiency decreases monotonously. At the time point at which the target air-fuel ratio is switched from the first air-fuel ratio to the third air-fuel ratio, the indicated ignition timing efficiency is returned to 1. Thereafter, during a period until the target air-fuel ratio is switched from the third air-fuel ratio to the second air-fuel ratio, the indicated ignition timing efficiency decreases monotonously once again.

The indicated ignition timing efficiency determines the ignition timing. The smaller that the value of the indicated ignition timing efficiency is, the greater that the retardation amount with respect to the optimal ignition timing of the ignition timing becomes. During a period from the time that the virtual air-fuel ratio is switched from the first air-fuel ratio to the second air-fuel ratio until the target air-fuel ratio is switched from the first air-fuel ratio to the third air-fuel ratio, the ignition timing is retarded monotonously in response to a decrease in the indicated ignition timing efficiency. However, in response to the indicated ignition timing efficiency being returned to 1 at a time point at which the target air-fuel ratio is switched from the first air-fuel ratio to the third air-fuel ratio, the ignition timing is returned to the optimal ignition timing once again. Further, during a period until the target air-fuel ratio is switched from the third air-fuel ratio to the second air-fuel ratio, the ignition timing is once again monotonously retarded in response to a decrease in the indicated ignition timing efficiency.

In the above described comparative example, during a transitional period in which switching of the operation mode is being performed, it is required to continuously retard the ignition timing in a monotonous manner. However, a retardation limit is set for the ignition timing, and it is not permitted to retard the ignition timing beyond the retardation limit. Consequently, an increase in torque that is caused by an excess in the air amount cannot be adequately cancelled out by retardation of the ignition timing. In contrast, according to the logic adopted in the present embodiment, during a transitional period, the ignition timing is not continuously retarded in a monotonous manner, but rather is returned to the optimal ignition timing temporarily during the retardation process, and is then retarded monotonously once again in a manner that takes the optimal ignition timing as the starting point. By controlling the ignition timing in this way, the ignition timing is not retarded so far as to arrive at the retardation limit, and thus an increase in torque that is caused by an excess in the air amount is reliably cancelled out by decreasing the torque by retarding the ignition timing. Hence, according to the logic adopted in the present embodiment, the operation mode can be switched from operation according to the first air-fuel ratio to operation according to the second air-fuel ratio without generating fluctuations in the torque.

Embodiment 2

Next, Embodiment 2 of the present invention will be described with reference to the drawings.

The logic of the arithmetic unit 408 differs between Embodiment 2 and Embodiment 1. The overall logic of the arithmetic unit 122 in which the arithmetic unit 408 is included is common to that of Embodiment 1, and the logic of the arithmetic unit 122 according to the present embodiment can also be represented by FIG. 2. Further, the overall logic of the ECU is common to that of Embodiment 1, and the logic of the ECU according to the present embodiment can also be represented by FIG. 1.

Figure 5:
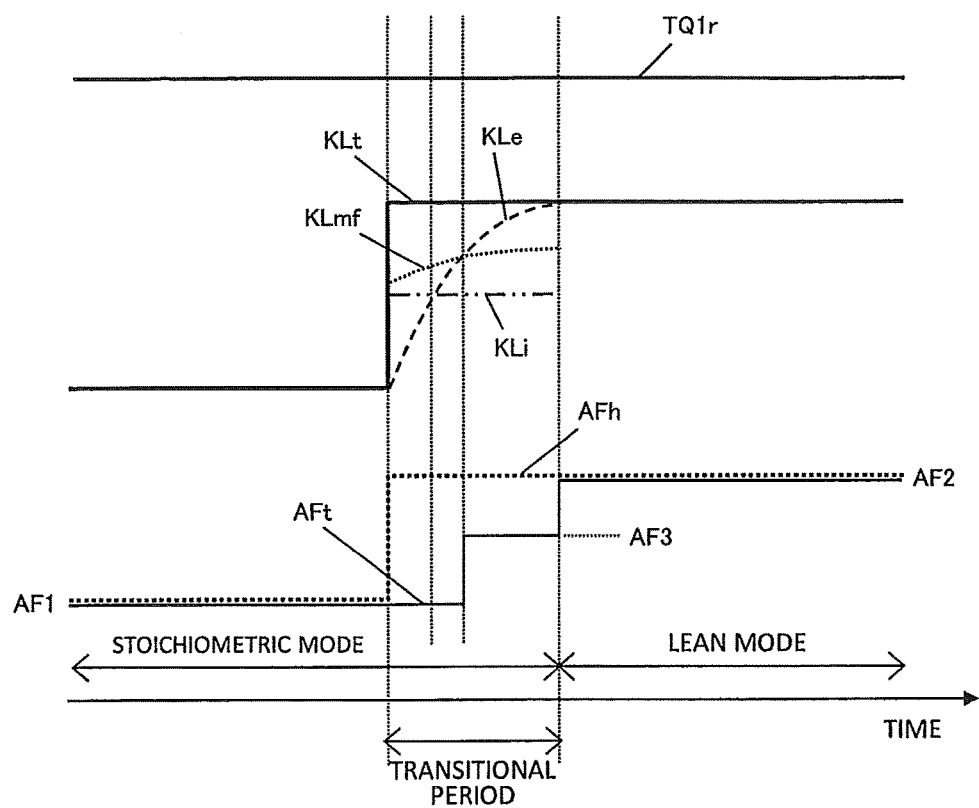
FIG. 5 is a time chart illustrating the logic for switching an operation mode of the control device according to Embodiment 2 of the present invention.

FIG. 5 is a time chart illustrating the logic of the arithmetic unit 408 according to the present embodiment. A chart on the first (upper) level in FIG. 5 illustrates changes over time in the requested first torque. A chart on the second level from the top illustrates changes over time in the target air amount, the estimated air amount, the intermediate air amount and the minimum air amount, respectively. The term "minimum air amount" refers to a minimum value of the air amount which does not cause misfiring under the third air-fuel ratio. In FIG. 5, the minimum air amount is described as "KLmf". A chart on the third level from the top illustrates changes over time in the virtual air-fuel ratio and the target air-fuel ratio, respectively.

The arithmetic unit 408 according to the present embodiment calculates the minimum air amount based on various conditions that relate to misfiring, such as the number of engine revolutions and the intake air temperature. Upon detecting that the virtual air-fuel ratio has been switched from the first air-fuel ratio to the second air-fuel ratio, the arithmetic unit 408 performs a comparison between the intermediate air amount and the estimated air amount for each control step, and also performs a comparison between the minimum air amount and the estimated air amount for each control step. Further, the arithmetic unit 408 switches the target air-fuel ratio from the first air-fuel ratio to the third air-fuel ratio at a time point at which the estimated air amount has become equal to or greater than the intermediate air amount and the estimated air amount has become equal to or greater than the minimum air amount. Calculation of the minimum air amount by the arithmetic unit 408 is performed for each control step from the time at which the virtual air-fuel ratio is switched from the first air-fuel ratio to the second air-fuel ratio until the target air-fuel ratio is switched from the first air-fuel ratio to the third air-fuel ratio. The processing after the target air-fuel ratio is switched to the third air-fuel ratio is the same as in Embodiment 1. The arithmetic unit 408 switches the target air-fuel ratio from the third air-fuel ratio to the second air-fuel ratio at a time point at which a difference between the target air amount and the estimated air amount becomes equal to or less than the predetermined threshold value.

According to the logic for switching the operation mode that is adopted in the present embodiment, misfiring that is caused by an insufficient air amount can be prevented when the target air-fuel ratio is switched to the third air-fuel ratio. Note that, in a case where the minimum air amount is less than the intermediate air amount, similar control results as the control results according to Embodiment 1 are obtained.

Embodiment 3

Next, Embodiment 3 of the present invention will be described referring to the drawings.

The logic of the arithmetic unit 408 differs between Embodiment 3 and Embodiments 1 and 2. The overall logic of the arithmetic unit 122 in which the arithmetic unit 408 is included is common to that of Embodiment 1, and the logic of the arithmetic unit 122 according to the present embodiment can also be represented by FIG. 2. Further, the overall logic of the ECU is common to that of Embodiment 1, and the logic of the ECU according to the present embodiment can also be represented by FIG. 1.

According to the logic of Embodiment 1, before the ignition timing arrives at the retardation limit, the target air-fuel ratio is switched to the third air-fuel ratio and the ignition timing is advanced as far as the optimal ignition timing. However, due to special operating conditions or individual differences among engines, there is a possibility that the ignition timing will arrive at the retardation limit before the target air-fuel ratio is switched to the third air-fuel ratio. A function for dealing with such a case is added to the arithmetic unit 408 according to the present embodiment.

In a case where the ignition timing is retarded as far as the retardation limit within a transitional period of the operation mode, the arithmetic unit 408 according to the present embodiment calculates a torque (hereunder, described as "torque A") that can be achieved with the current estimated air amount in a case where the air-fuel ratio is set to the third air-fuel ratio and the ignition timing is set to the optimal ignition timing. Further, the arithmetic unit 408 also calculates a torque (hereunder, described as "torque B") that can be achieved with the current estimated air amount in a case where the air-fuel ratio is maintained at the first air-fuel ratio and the ignition timing is maintained at the retardation limit. The arithmetic unit 408 then calculates a shortfall in the torque A relative to the requested first torque and calculates an excess in the torque B relative to the requested first torque, and determines which of the shortfall and the excess is the smaller amount. If the shortfall is smaller, the arithmetic unit 408 immediately switches the target air-fuel ratio from the first air-fuel ratio to the third air-fuel ratio. On the other hand, if the excess is smaller, the arithmetic unit 408 maintains the target air-fuel ratio at the first air-fuel ratio and waits for the estimated air amount to arrive at the intermediate air amount, and then switches the target air-fuel ratio from the first air-fuel ratio to the third air-fuel ratio. The processing after the target air-fuel ratio is switched to the third air-fuel ratio is the same as in Embodiment 1. The arithmetic unit 408 switches the target air-fuel ratio from the third air-fuel ratio to the second air-fuel ratio at a time point at which a difference between the target air amount and the estimated air amount becomes equal to or less than the predetermined threshold value.

Next, control results in a case in which engine control is executed in accordance with the logic for switching the operation mode that is adopted in the present embodiment will be described based on time charts illustrating an image thereof.

Figure 6:
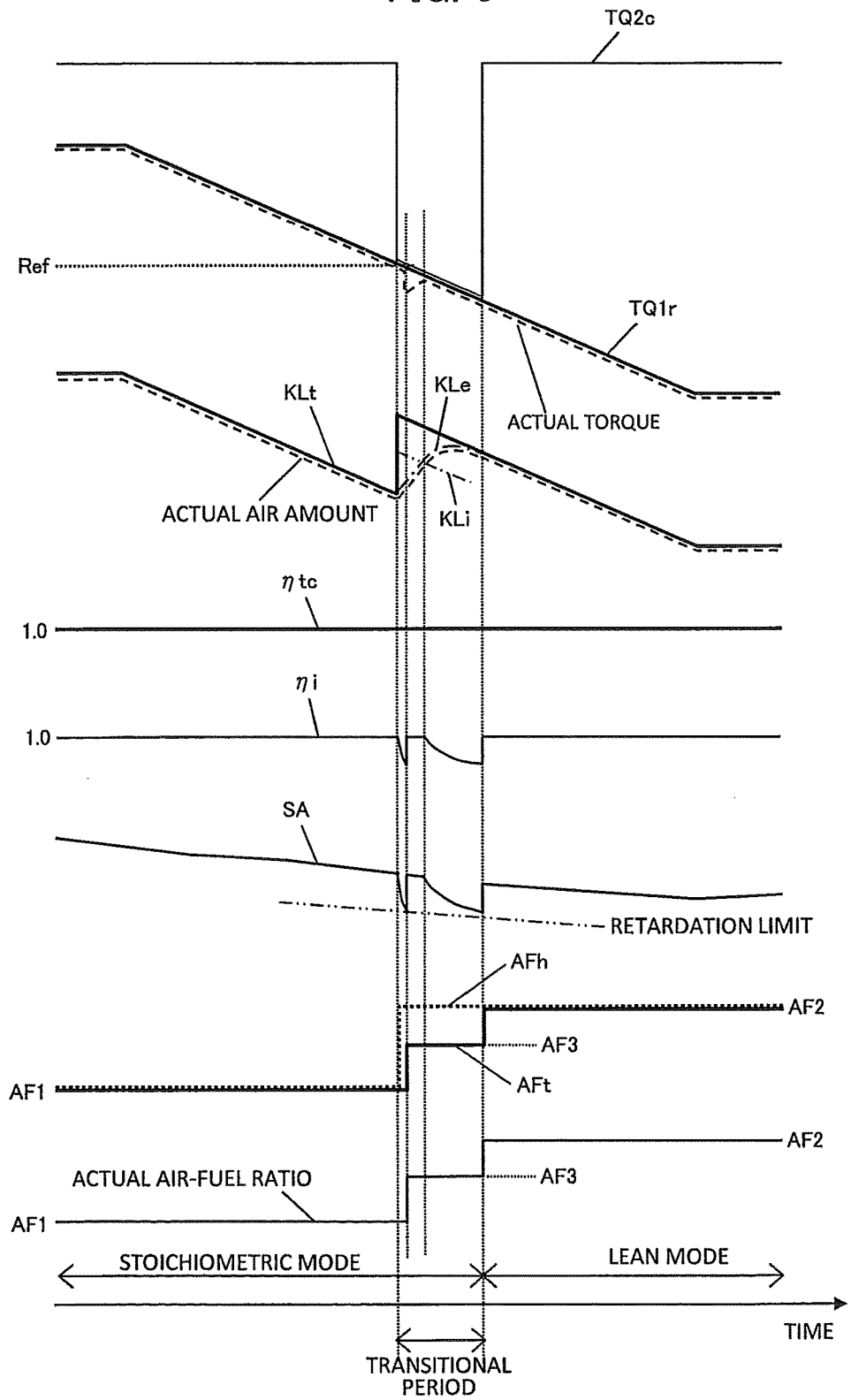
FIG. 6 is a time chart that illustrates an image of results of control performed by the control device according to Embodiment 3 of the present invention.
Figure 7:
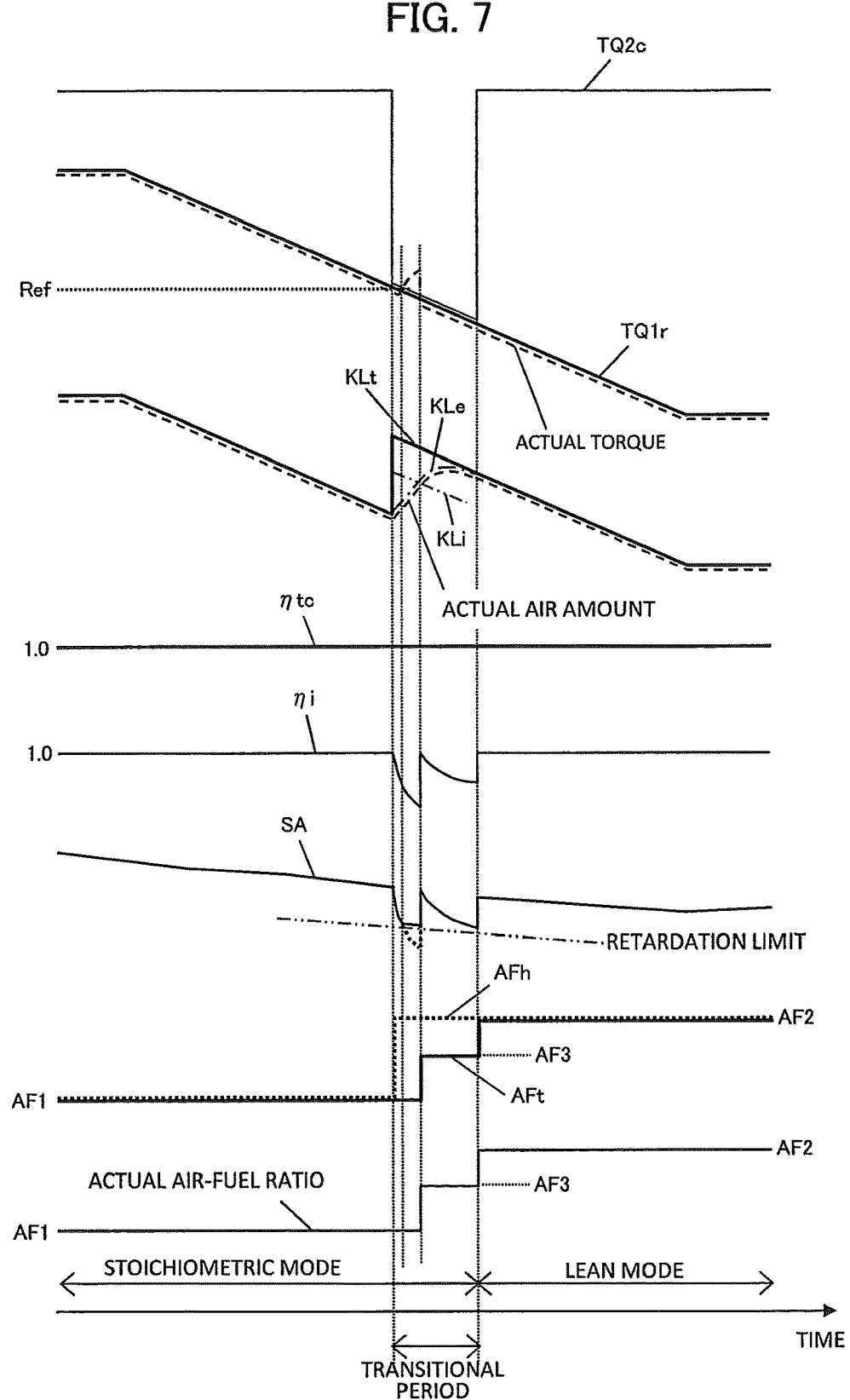
FIG. 7 is a time chart that illustrates an image of results of control performed by the control device according to Embodiment 3 of the present invention.
Figure 8:
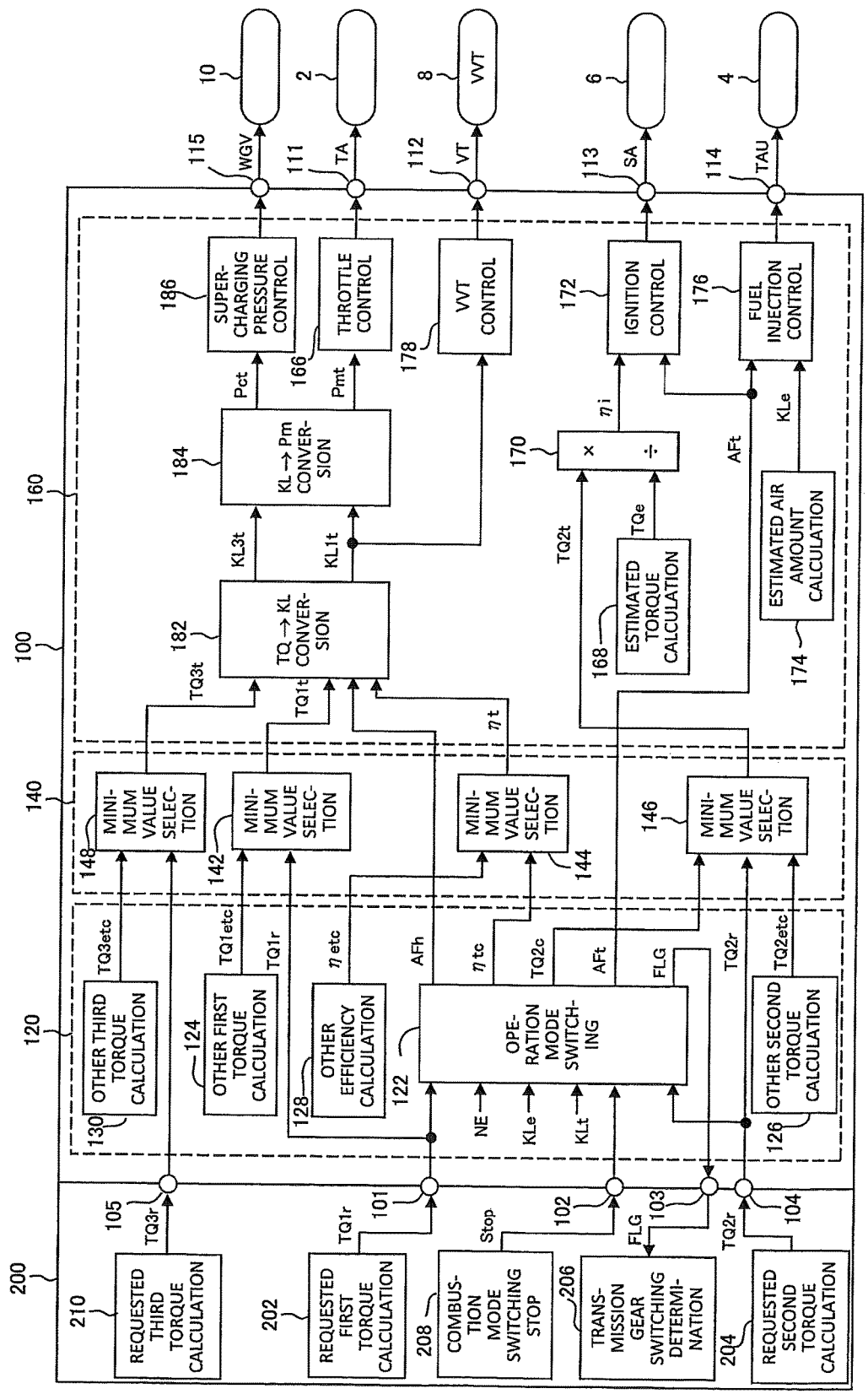
FIG. 8 is a block diagram illustrating the logic of a control device according to Embodiment 4 of the present invention.

FIG. 6 and FIG. 7 are time charts illustrating an image of results of control by the ECU according to the present embodiment. In each of FIG. 6 and FIG. 7, control results are illustrated for a case in which the ignition timing arrives at the retardation limit before the target air-fuel ratio is switched to the third air-fuel ratio. Each of the time charts is constituted by charts at multiple levels, and the contents shown in the respective charts are common with the contents of the time chart illustrated in FIG. 3.

First, FIG. 6 will be described. The control results illustrated in FIG. 6 are results of control in a case where it is determined that a shortfall in the torque A relative to the requested first torque is less than an excess in the torque B relative to the requested first torque. In this case, immediately after the ignition timing is retarded as far as the retardation limit, the target air-fuel ratio is switched from the first air-fuel ratio to the third air-fuel ratio. Because the estimated air amount has not arrived at the intermediate air amount at this time point, the estimated torque becomes smaller than the requested first torque upon the target air-fuel ratio being switched to the third air-fuel ratio, and the indicated ignition timing efficiency is returned to 1. By this means, the ignition timing is advanced in a step manner from the retardation limit to the optimal ignition timing. As a result of the target air-fuel ratio and the ignition timing being controlled in this way, the actual torque and the estimated torque temporarily decrease relative to the requested first torque at the time point at which the target air-fuel ratio is switched to the third air-fuel ratio. After the estimated air amount exceeds the intermediate air amount, although the estimated torque exceeds the requested first torque, an increase in the actual torque relative to the requested first torque is avoided as a result of the retardation of the ignition timing working effectively.

Next, FIG. 7 will be described. The control results illustrated in FIG. 7 are results of control in a case where it is determined that an excess in the torque B relative to the requested first torque is less than a shortfall in the torque A relative to the requested first torque. In this case, the target air-fuel ratio is maintained at the first air-fuel ratio even after the ignition timing is retarded as far as the retardation limit, and the ignition timing remains fixed at the retardation limit. As a result, the actual torque becomes temporarily excessive relative the requested first torque. Thereafter, when the estimated air amount arrives at the intermediate air amount, the target air-fuel ratio is switched from the first air-fuel ratio to the third air-fuel ratio, and in accompaniment therewith the ignition timing is advanced in a step manner as far as the optimal ignition timing. As a result, the actual torque matches the requested first torque once again. Thereafter, an increase in the actual torque relative to the requested first torque is avoided as a result of the retardation of the ignition timing working effectively.

As described above, according to the logic adopted in the present embodiment, even in a case where the ignition timing arrives at the retardation limit, the amount by which the actual torque diverges from the requested first torque can be kept to, a minimum, and fluctuations in the torque that accompany processing to switch the operation mode can be suppressed.

Embodiment 4

Next, Embodiment 4 of the present invention will be described with reference to the drawings.

An engine which is a control object in the present embodiment is a spark-ignition type, four-cycle reciprocating engine, and is a supercharged lean-burn engine that is equipped with a turbocharger. Actuators that are actuated by an ECU that controls the operations of the engine according to the present embodiment include, in addition to a throttle, a VVT, an ignition device and an injector, a waste gate valve (hereunder, referred to as "WGV") that is provided in a turbocharger. The WGV is a supercharging characteristic varying actuator that varies a supercharging characteristic of the turbocharger. Because a supercharging characteristic of the turbocharger causes an air amount to change, the WGV is included in the first actuators that cause an air amount to change, similarly to the throttle and VVT.

In FIG. 5, the logic of the ECU according to the present embodiment is illustrated by means of a block diagram. The ECU includes an engine controller 100 and a powertrain manager 200. In the block showing the powertrain manager 200, various functions that the powertrain manager 200 is equipped with are represented by blocks. Among these, blocks representing functions that are common to those of the ECU according to Embodiment 1 are denoted by common reference numerals. Further, in the block showing the engine controller 100, among various functions that the engine controller 100 is equipped with, functions relating to coordinated operations of the actuators are represented by blocks. Among these, blocks representing functions that are common to those of the ECU according to Embodiment 1 are denoted by common reference numerals. The following description centers on differences with respect to Embodiment 1, that is, on blocks that represent functions that are specific to control of a supercharged lean-burn engine.

The powertrain manager 200 according to the present embodiment is equipped with an arithmetic unit 210 in addition to the arithmetic units 202, 204, 206 and 208 that are common with Embodiment 1. The arithmetic unit 210 calculates a requested third torque and sends the calculated value to the engine controller 100. In FIG. 7, the requested first torque is described as "TQ3r". Similarly to the first torque, the third torque is a torque that the engine is required to generate steadily or over an extended period. The relation between the third torque and the first torque is similar to the relation between the first torque and the second torque. That is, when viewed from the side of the first torque, the first torque is a torque of a kind with respect to which the urgency or priority is higher than the third torque and for which a high responsiveness is required of the engine. That is, the first torque is of a kind which is required to be realized at an earlier timing than the third torque. The requested third torque is a requested value of the third torque that the powertrain manager 200 requests with respect to the engine. When the three kinds of requested torques that are calculated by the powertrain manager 200 are listed in the order of greater urgency or higher priority, that is, the order of higher responsiveness required of the engine, the order thereof is: requested second torque, requested first torque, requested third torque. The arithmetic unit 210 calculates the requested third torque based on a signal that corresponds to the state of the opening degree of the accelerator pedal. In the present embodiment, together with the requested first torque, the requested third torque corresponds to a requested torque in the present invention. A torque that is obtained by removing a temporary pulse component in a torque decreasing direction from the requested first torque can also be adopted as the requested third torque.

The engine controller 100 according to the present embodiment is constituted by three large arithmetic units 120, 140 and 160, similarly to Embodiment 1. The large arithmetic unit 120 is equipped with an arithmetic unit 130 in addition to the arithmetic units 122, 124, 126 and 128 that are common with Embodiment 1. The arithmetic unit 130 calculates, as a control parameter for the engine, a torque that is classified as a third torque among torques that are necessary for maintaining the current operating state of the engine or for realizing a scheduled predetermined operating state. In this case, a torque that is calculated by the arithmetic unit 130 is referred to as "other third torque". In the drawing, the other third torque is described as "TQ3etc". The arithmetic unit 130 outputs a valid value only in a case where such a torque is actually required, and calculates an invalid value during a period in which such a torque is not required. The invalid value is set to a value that is greater than the maximum indicated torque that the engine can output.

The large arithmetic unit 140 according to the present embodiment is equipped with an arithmetic unit 148 in addition to the arithmetic units 142, 144 and 146 that are common with Embodiment 1. The arithmetic unit 148 is configured to perform a mediation process with respect to the third torque. The requested third torque and the other third torque are input to the arithmetic unit 148. The arithmetic unit 148 performs a mediation process on these values, and outputs a torque that is obtained as the mediation result as a target third torque that is finally determined. In FIG. 7, the target third torque that is finally determined is described as "TQ3t". Minimum value selection is used as the mediation method in the arithmetic unit 148. Accordingly, in a case where a valid value is not output from the arithmetic unit 130, the requested third torque that is provided from the powertrain manager 200 is calculated as the target third torque.

The large arithmetic unit 160 according to the present embodiment handles each of the target first torque, the target second torque and the target third torque that are input from the large arithmetic unit 140 as target values of the torque with respect to the engine. Therefore, the large arithmetic unit 160 according to the present embodiment is equipped with an arithmetic unit 182 instead of the arithmetic unit 162 according to Embodiment 1, and is equipped with an arithmetic unit 184 instead of the arithmetic unit 164 according to Embodiment 1.

The target first torque and the target third torque are input to the arithmetic unit 182. Furthermore, the target efficiency and the virtual air-fuel ratio are also input thereto. The arithmetic unit 182 corresponds to target air amount calculation means in the present invention. By means of a method common to that employed by the arithmetic unit 162 according to Embodiment 1, the arithmetic unit 182 uses the target efficiency and the virtual air-fuel ratio to back-calculate a target air amount (hereunder, referred to as "target first air amount") for achieving the target first torque from the target first torque. The target first air amount is described as "KL1t" in the drawing. In the present embodiment, the target first air amount is used by the arithmetic unit 178 to calculate the target valve timing.

Further, concurrently with calculation of the target first air amount, the arithmetic unit 182 uses the target efficiency and the virtual air-fuel ratio to back-calculate a target air amount (hereunder, referred to as "target third air amount") for achieving the target third torque from the target third torque. The target third air amount is described as "KL3t" in the drawing. When calculating the target third air amount also, the target efficiency and virtual air-fuel ratio are used as parameters that provide a conversion efficiency of the air amount to torque. If the value of the virtual air-fuel ratio is changed in the same manner as in Embodiment 1 in the calculation of the target first air amount, the value of the virtual air-fuel ratio is also similarly changed in the calculation of the target third air amount.

The arithmetic unit 184 back-calculates the target intake pipe pressure from the target first air amount by a method common to that employed by the arithmetic unit 164 according to Embodiment 1. The target intake pipe pressure is described as "Pmt" in the drawing. The target intake pipe pressure is used by the arithmetic unit 166 to calculate the target throttle opening degree.

In addition, concurrently with calculation of the target intake pipe pressure, the arithmetic unit 184 back-calculates a target supercharging pressure from the target third air amount. The target supercharging pressure is described as "Pct" in the drawing. When calculating the target supercharging pressure, first, using a method common to that used to calculate the target intake pipe pressure, the target third air amount is converted to an intake pipe pressure. A reserve pressure is then added to the intake pipe pressure obtained by converting the target third air amount, and the sum value is calculated as the target supercharging pressure. The reserve pressure is the minimum margin of the supercharging pressure with respect to the intake pipe pressure. Note that, although the reserve pressure may be a fixed value, for example, the reserve pressure can also be changed in response to a change in the intake pipe pressure.

The large arithmetic unit 160 according to the present embodiment further includes an arithmetic unit 186. The arithmetic unit 186 calculates a target waste gate valve opening degree that is a target value of the waste gate valve opening degree, based on the target supercharging pressure. The target waste gate valve opening degree is described as "WGV" in the drawing. A map or model in which the supercharging pressure and the waste gate valve opening degree are associated is used to calculate the target waste gate valve opening degree. The target waste gate valve opening degree calculated by the arithmetic unit 186 is converted to a signal that drives the WGV 10, and is sent to the WGV 10 through an interface 115 of the ECU. The arithmetic unit 186 corresponds to first actuator control means in the present invention. Note that, a duty ratio of a solenoid that drives the WGV 10 may also be adopted as the operation amount of the WGV 10 instead of the waste gate valve opening degree.

According to the ECU that is configured as described above, by subjecting the plurality of actuators 2, 4, 6, 8 and 10 including the WGV 10 to coordinated operations, the task of switching the air-fuel ratio with favorable responsiveness while smoothly changing the torque in response to a request of the driver can be achieved in a supercharged lean-burn engine also. Note that, operating ranges of the engine are defined by the intake pipe pressure and the number of engine revolutions. A lean mode region in which the lean mode is selected is set in a low-to-medium speed and low-to-medium load region, and part of a region on a high load side thereof overlaps with a supercharging region in which the intake pipe pressure becomes higher than the atmospheric pressure. The settings of the operating ranges are mapped and stored in the ECU. The ECU executes switching of the operation mode in accordance with the map.

[Other]

The present invention is not limited to the above described embodiments, and various modifications can be made within a range that does not depart from the gist of the present invention. For example, the modifications described hereunder may be adopted.

The timing of switching the target air-fuel ratio in Embodiment 1 may be a timing that is after the time point at which the estimated air amount arrives at the intermediate air amount. Since there is an error between the actual air amount and the estimated air amount, it is possible for a situation to occur in which the actual air amount has not arrived at the intermediate air amount at the time point at which the target air-fuel ratio is switched from the first air-fuel ratio to the third air-fuel ratio. In such a case, the actual torque will be insufficient relative to the requested torque. Hence, switching the target air-fuel ratio to the third air-fuel ratio after waiting for the actual air amount to definitely arrive at the intermediate air amount is preferable with respect to avoiding a shortage in the torque. However, it is necessary to keep in mind that the possibility of the ignition timing arriving at the retardation limit will increase if the timing of switching the target air-fuel ratio is delayed too much.

The air-fuel ratio (virtual air-fuel ratio) that is used for calculating the target air amount in Embodiment 1 can be substituted with an equivalence ratio. The equivalence ratio is also a parameter that provides a conversion efficiency of the air amount to torque, and corresponds to a parameter that corresponds to the air-fuel ratio. Likewise, an excess air factor can be used as a parameter that provides a conversion efficiency of the air amount to torque.

A variable lift amount mechanism that makes a lift amount of the intake valve variable can also be used as a first actuator that changes the amount of air drawn into the cylinders. The variable lift amount mechanism can be independently used instead of the throttle, or can be used in combination with another first actuator such as the throttle or VVT. The VVT may also be omitted.

A variable nozzle can also be used as a supercharging characteristic varying actuator that changes a supercharging characteristic of the turbocharger. Further, if the turbocharger is assisted by an electric motor, the electric motor can also be used as a supercharging characteristic varying actuator.

In the embodiment of the present invention, an injector as a second actuator is not limited to a port injector. An in-cylinder injector that injects fuel directly into a combustion chamber can also be used, and both a port injector and an in-cylinder injector may also be used in combination.

The first air-fuel ratio is not limited to the theoretical air-fuel ratio. The first air-fuel ratio can also be set to an air-fuel ratio that is leaner than the theoretical air-fuel ratio, and an air-fuel ratio that is leaner than the first air-fuel ratio can be set as the second air-fuel ratio.

REFERENCE SIGNS LIST

2 Throttle
4 Injector
6 Ignition device
8 Variable valve timing mechanism
10 Waste gate valve 100 Engine controller
101 Interface as requested torque reception means
200 Powertrain manager
162, 182 Arithmetic unit as target air amount calculation means
164, 166, 178 Arithmetic unit as first actuator control means
174, 176 Arithmetic unit as second actuator control means
168, 170, 172 Arithmetic unit as third actuator control means
404 Arithmetic unit as parameter value changing means
406, 408 Arithmetic unit as target air-fuel ratio switching means

The invention claimed is:

1. A control device for an internal combustion engine that includes a first actuator that changes an amount of air that is drawn into a cylinder, a second actuator that supplies fuel into a cylinder, and a third actuator that ignites an air-fuel mixture in a cylinder, and that is configured to be capable of selecting between operation in a first air-fuel ratio and operation in a second air-fuel ratio that is leaner than the first air-fuel ratio, the control device comprising: a requested torque reception means for receiving a requested torque; a target air amount calculation means for back-calculating a target air amount for achieving the requested torque from the requested torque using a parameter that provides a conversion efficiency of the air amount to torque; a virtual air-fuel ratio changing means for changing a virtual air-fuel ratio included in the parameter from the first air-fuel ratio to the second air-fuel ratio in response to a condition for switching the operation mode from operation according to the first air-fuel ratio to operation according to the second air-fuel ratio being satisfied; a target air-fuel ratio switching means for, after the virtual air-fuel ratio is changed from the first air-fuel ratio to the second air-fuel ratio, switching a target air-fuel ratio from the first air-fuel ratio to a third air-fuel ratio that is an air-fuel ratio between the first air-fuel ratio and the second air-fuel ratio, and switching the target air-fuel ratio from the third air-fuel ratio to the second air-fuel ratio; a first actuator control means for determining an operation amount of the first actuator based on the target air amount, and operating the first actuator in accordance with the operation amount; a second actuator control means for determining a fuel supply amount based on the target air-fuel ratio, and operating the second actuator in accordance with the fuel supply amount; and a third actuator control means for determining an ignition timing for achieving the requested torque based on a torque that is estimated based on the operation amount of the first actuator and the target air-fuel ratio, and the requested torque, and operating the third actuator in accordance with the requested torque, wherein the target air-fuel ratio switching means switches the target air-fuel ratio from the first air-fuel ratio to the third air-fuel ratio in response to an air amount that is estimated based on the operation amount of the first actuator reaching an air amount with which the requested torque can be achieved under the third air-fuel ratio, and wherein, in a case where the air amount with which the requested torque can be achieved under the third air-fuel ratio is less than a minimum air amount which does not cause misfiring, the target air-fuel ratio switching means switches the target air-fuel ratio from the first air-fuel ratio to the third air-fuel ratio in response to the air amount that is estimated based on the operation amount of the first actuator exceeding the minimum air amount.

2. The control device for an internal combustion engine according to claim 1,
wherein, in a case where the ignition timing is retarded as far as a retardation limit before the air amount that is estimated based on the operation amount of the first actuator reaches an air amount with which the requested torque can be achieved under the third air-fuel ratio, based on a condition that a shortfall in a torque that can be achieved under the third air-fuel ratio relative to the requested torque is less than an excess in a torque that can be achieved under the first air-fuel ratio relative to the requested torque, the target air-fuel ratio switching means switches the target air-fuel ratio from the first air-fuel ratio to the third air-fuel ratio.

3. The control device for an internal combustion engine according to claim 1,
wherein, after a fixed time period elapses after switching of the target air-fuel ratio to the third air-fuel ratio, the target air-fuel ratio switching means switches the target air-fuel ratio from the third air-fuel ratio to the second air-fuel ratio.

4. The control device for an internal combustion engine according to claim 1, wherein:
the first actuator includes a throttle; and
the first actuator control means determines a target throttle opening degree based on a target intake pipe pressure that is calculated based on the target air amount, and operates the throttle in accordance with the target throttle opening degree.

5. The control device for an internal combustion engine according to claim 1, wherein:
the first actuator includes a variable valve timing mechanism that varies a valve timing of an intake valve; and
the first actuator control means determines a target valve timing based on the target air amount, and operates the variable valve timing mechanism in accordance with the target valve timing.

6. The control device for an internal combustion engine according to claim 1, wherein:
the internal combustion engine is a supercharged engine equipped with a supercharger,
the first actuator includes a supercharging characteristic varying actuator that varies a supercharging characteristic of the supercharger; and
the first actuator control means determines an operation amount of the supercharging characteristic varying actuator based on a target supercharging pressure that is calculated based on the target air amount, and operates the supercharging characteristic varying actuator in accordance with the operation amount.

7. A control device for an internal combustion engine,
the internal combustion engine including:
a cylinder;
a first actuator configured to change an amount of air supplied to the cylinder;
a second actuator configured to supply fuel into the cylinder; and
a third actuator configured to ignite an air-fuel mixture in the cylinder,
the control device comprising at least one processor programmed to actuate the first, second and third actuators to control operation of the engine, and to switch an operation mode of the engine between a first operation according to a first air-fuel ratio and a second operation according to a second air-fuel ratio leaner than the first air-fuel ratio,
wherein the at least one processor is programmed to
in response to a requested torque, back-calculate a target air amount for achieving the requested torque from the requested torque using a parameter that provides a conversion efficiency of the air amount to torque, change a virtual air-fuel ratio included in the parameter from the first air-fuel ratio to the second air-fuel ratio in response to a condition for switching the operation mode from the first operation according to the first air-fuel ratio to the second operation according to the second air-fuel ratio being satisfied, in response to the virtual air-fuel ratio changed from the first air-fuel ratio to the second air-fuel ratio, switch a target air-fuel ratio from the first air-fuel ratio to a third air-fuel ratio that is an air-fuel ratio between the first air-fuel ratio and the second air-fuel ratio, and then switch the target air-fuel ratio from the third air-fuel ratio to the second air-fuel ratio, determine an operation amount of the first actuator based on the target air amount, and operate the first actuator in accordance with the operation amount, determine a fuel supply amount based on the target air-fuel ratio, and operate the second actuator in accordance with the fuel supply amount, and determine an ignition timing for achieving the requested torque based on a torque that is estimated based on the operation amount of the first actuator and the target air-fuel ratio, and the requested torque, and operate the third actuator in accordance with the requested torque, wherein the at least one processor is programmed to switch the target air-fuel ratio from the first air-fuel ratio to the third air-fuel ratio in response to an estimated air amount, that is estimated based on the operation amount of the first actuator, reaching an intermediate air amount with which the requested torque is achievable under the third air-fuel ratio, and wherein when the intermediate air amount is less than a minimum air amount which does not cause misfiring, the at least one processor is programmed to switch the target air-fuel ratio from the first air-fuel ratio to the third air-fuel ratio in response to the estimated air amount exceeding the minimum air amount.

8. The control device according to claim 7, wherein when the ignition timing is retarded as far as a retardation limit before the estimated air amount reaches the intermediate air amount, the at least one processor is programmed to switch the target air-fuel ratio from the first air-fuel ratio to the third air-fuel ratio based on a condition that a shortfall in a torque achievable under the third air-fuel ratio relative to the requested torque is less than an excess in a torque achievable under the first air-fuel ratio relative to the requested torque.

9. A control device for an internal combustion engine, the internal combustion engine including:

a cylinder;

a first actuator configured to change an amount of air supplied to the cylinder;

a second actuator configured to supply fuel into the cylinder; and a third actuator configured to ignite an air-fuel mixture in the cylinder, the control device comprising at least one processor programmed to actuate the first, second and third actuators to control operation of the engine, and to switch an operation mode of the engine between a first operation according to a first air-fuel ratio and a second operation according to a second air-fuel ratio leaner than the first air-fuel ratio, wherein the at least one processor is programmed to in response to a requested torque, back-calculate a target air amount for achieving the requested torque from the requested torque using a parameter that provides a conversion efficiency of the air amount to torque, change a virtual air-fuel ratio included in the parameter from the first air-fuel ratio to the second air-fuel ratio in response to a condition for switching the operation mode from the first operation according to the first air-fuel ratio to the second operation according to the second air-fuel ratio being satisfied, in response to the virtual air-fuel ratio changed from the first air-fuel ratio to the second air-fuel ratio, switch a target air-fuel ratio from the first air-fuel ratio to a third air-fuel ratio that is an air-fuel ratio between the first air-fuel ratio and the second air-fuel ratio, and then switch the target air-fuel ratio from the third air-fuel ratio to the second air-fuel ratio, determine an operation amount of the first actuator based on the target air amount, and operate the first actuator in accordance with the operation amount, determine a fuel supply amount based on the target air-fuel ratio, and operate the second actuator in accordance with the fuel supply amount, and determine an ignition timing for achieving the requested torque based on a torque that is estimated based on the operation amount of the first actuator and the target air-fuel ratio, and the requested torque, and operate the third actuator in accordance with the requested torque, wherein the at least one processor is programmed to switch the target air-fuel ratio from the first air-fuel ratio to the third air-fuel ratio in response to an estimated air amount, that is estimated based on the operation amount of the first actuator, reaching an intermediate air amount with which the requested torque is achievable under the third air-fuel ratio, and wherein after switching the target air-fuel ratio to the third air-fuel ratio, the at least one processor is programmed to switch the target air-fuel ratio from the third air-fuel ratio to the second air-fuel ratio in response to a difference between the target air amount and the estimated air becoming equal to or less than a threshold value.

10. The control device according to claim 7, wherein when a fixed time period from switching of the target air-fuel ratio to the third air-fuel ratio elapses, the at least one processor is programmed to switch the target air-fuel ratio from the third air-fuel ratio to the second air-fuel ratio.

11. The control device according to claim 7, wherein the first actuator includes a throttle, and the at least one processor is programmed to determine a target throttle opening degree based on a target intake pipe pressure that is calculated based on the target air amount, and operate the throttle in accordance with the target throttle opening degree.

12. The control device according to claim 7, wherein the first actuator includes a variable valve timing mechanism configured to vary a valve timing of an intake valve of the cylinder, and the at least one processor is programmed to
- determine a target valve timing based on the target air amount, and
- operate the variable valve timing mechanism in accordance with the target valve timing.

13. The control device according to claim 7, wherein the internal combustion engine is a supercharged engine equipped with a supercharger, the first actuator includes a supercharging characteristic varying actuator configured to vary a supercharging characteristic of the supercharger, and the at least one processor is programmed to
- determine an operation amount of the supercharging characteristic varying actuator based on a target supercharging pressure that is calculated based on the target air amount, and
- operate the supercharging characteristic varying actuator in accordance with the operation amount.

\* \* \* \* \*